(12) United States Patent
Catoor et al.

(10) Patent No.: US 12,186,692 B2
(45) Date of Patent: Jan. 7, 2025

(54) FILTER ELEMENT AND METHOD FOR SERVICING A FILTER SYSTEM

(71) Applicant: Donaldson Company, Inc., Minneapolis, MN (US)

(72) Inventors: Bart Catoor, Minneapolis, MN (US); Mathijs Verstraete, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 763 days.

(21) Appl. No.: 17/421,314

(22) PCT Filed: Jan. 8, 2020

(86) PCT No.: PCT/US2020/012750
§ 371 (c)(1),
(2) Date: Jul. 7, 2021

(87) PCT Pub. No.: WO2021/006927
PCT Pub. Date: Jan. 14, 2021

(65) Prior Publication Data
US 2022/0054962 A1 Feb. 24, 2022

(30) Foreign Application Priority Data
Jan. 8, 2019 (EP) .................................... 19150836

(51) Int. Cl.
*B01D 46/00* (2022.01)
*B01D 46/24* (2006.01)
(Continued)

(52) U.S. Cl.
CPC ..... *B01D 46/0005* (2013.01); *B01D 46/0098* (2013.01); *B01D 46/2411* (2013.01);
(Continued)

(58) Field of Classification Search
None
See application file for complete search history.

(56) References Cited

U.S. PATENT DOCUMENTS 5,556,440 A * 9/1996 Mullins .............. B01D 46/2414
55/498
5,632,793 A * 5/1997 Haggard ............ B01D 46/2411
55/498
(Continued)

FOREIGN PATENT DOCUMENTS

CN 102119269 A 7/2011
CN 203648185 U 6/2014
(Continued)

OTHER PUBLICATIONS

Final Office Action for Chinese Patent Application No. 202080007479.5 mailed May 17, 2023.
(Continued)

*Primary Examiner* — Jason M Greene
(74) *Attorney, Agent, or Firm* — Merchant & Gould P.C.

(57) ABSTRACT

A filter element for filtering a fluid comprising a filter medium pack having an axial inlet side for receiving the unfiltered fluid and a circumferential side forming a radial boundary of the filter medium pack. The filter medium pack is configured for insertion into a housing of a filter system so as to enclose or partly enclose the circumferential side of the filter medium pack with an outer sidewall of the housing. The filter element comprises a bridge seal arrangement having a first collar-shaped portion comprising a first circumferential sealing surface sealingly coupled to the circumferential side of the filter medium pack or sealingly coupled to a border of the axial inlet side, and a second collar-shaped portion comprising a second circumferential
(Continued)

sealing surface configured for encircling and sealingly cooperating with the outer sidewall of the housing.

26 Claims, 22 Drawing Sheets

(51) Int. Cl.
*B01D 46/42* (2006.01)
*B01D 46/52* (2006.01)

(52) U.S. Cl.
CPC ....... *B01D 46/4227* (2013.01); *B01D 46/525* (2013.01); *B01D 2265/028* (2013.01); *B01D 2265/04* (2013.01); *B01D 2271/027* (2013.01)

(56) References Cited

U.S. PATENT DOCUMENTS

| | | | |
|---|---|---|---|
| 5,679,122 A | 10/1997 | Moll et al. | |
| 5,792,229 A | 8/1998 | Sassa et al. | |
| 5,820,646 A | 10/1998 | Gillingham et al. | |
| 5,863,482 A | 1/1999 | Schlör et al. | |
| 5,902,361 A | 5/1999 | Pomplun et al. | |
| 5,958,097 A | 9/1999 | Schlör et al. | |
| 6,235,195 B1* | 5/2001 | Tokar ................. | B01D 46/4227 210/493.4 |
| 6,267,796 B1 | 7/2001 | Schöttmer | |
| 6,375,699 B1 | 4/2002 | Beck | |
| 6,454,826 B2 | 9/2002 | Fath et al. | |
| 6,568,540 B1 | 5/2003 | Holzmann et al. | |
| 6,780,217 B1 | 8/2004 | Palmer | |
| 7,247,183 B2 | 7/2007 | Connor et al. | |
| 7,300,486 B1 | 11/2007 | Kirsch | |
| 7,341,613 B2 | 3/2008 | Kirsch | |
| 7,396,376 B2 | 7/2008 | Schrage et al. | |
| 8,029,589 B2 | 10/2011 | Driesen et al. | |
| 8,613,785 B1 | 12/2013 | Davis | |
| 10,220,334 B2 | 3/2019 | Wagner et al. | |
| 2002/0059867 A1* | 5/2002 | Gieseke ............. | B01D 46/4227 95/273 |
| 2008/0041026 A1 | 2/2008 | Engel et al. | |
| 2011/0061352 A1 | 3/2011 | Stahl et al. | |
| 2011/0167776 A1* | 7/2011 | Gorg ....................... | B01D 46/10 55/493 |
| 2012/0311983 A1 | 12/2012 | Swanson et al. | |
| 2015/0013293 A1 | 1/2015 | Wagner et al. | |
| 2017/0304759 A1 | 10/2017 | Foenss | |

FOREIGN PATENT DOCUMENTS

| | | |
|---|---|---|
| CN | 204756396 U | 11/2015 |
| CN | 206676068 U | 11/2017 |
| DE | 3439255 C2 | 3/1988 |
| DE | 3822155 A1 | 1/1989 |
| DE | 10135690 A1 | 2/2003 |
| DE | 102016005007 A1 | 10/2017 |
| DE | 102016006607 A1 | 12/2017 |
| DE | 102016011950 A1 | 4/2018 |
| EP | 1736227 A1 | 12/2006 |
| JP | 63-287521 A | 11/1988 |
| WO | 2005/123214 A1 | 12/2005 |
| WO | 2017/079191 A1 | 5/2017 |

OTHER PUBLICATIONS

International Search Report and Written Opinion for PCT/US2020/012750 (Mar. 31, 2020).
Second Office Action for Chinese Patent Application No. 202080007479.5 mailed Feb. 5, 2023.
Office Action for Chinese Patent Application No. 202080007479.5 (Jun. 17, 2022).

* cited by examiner

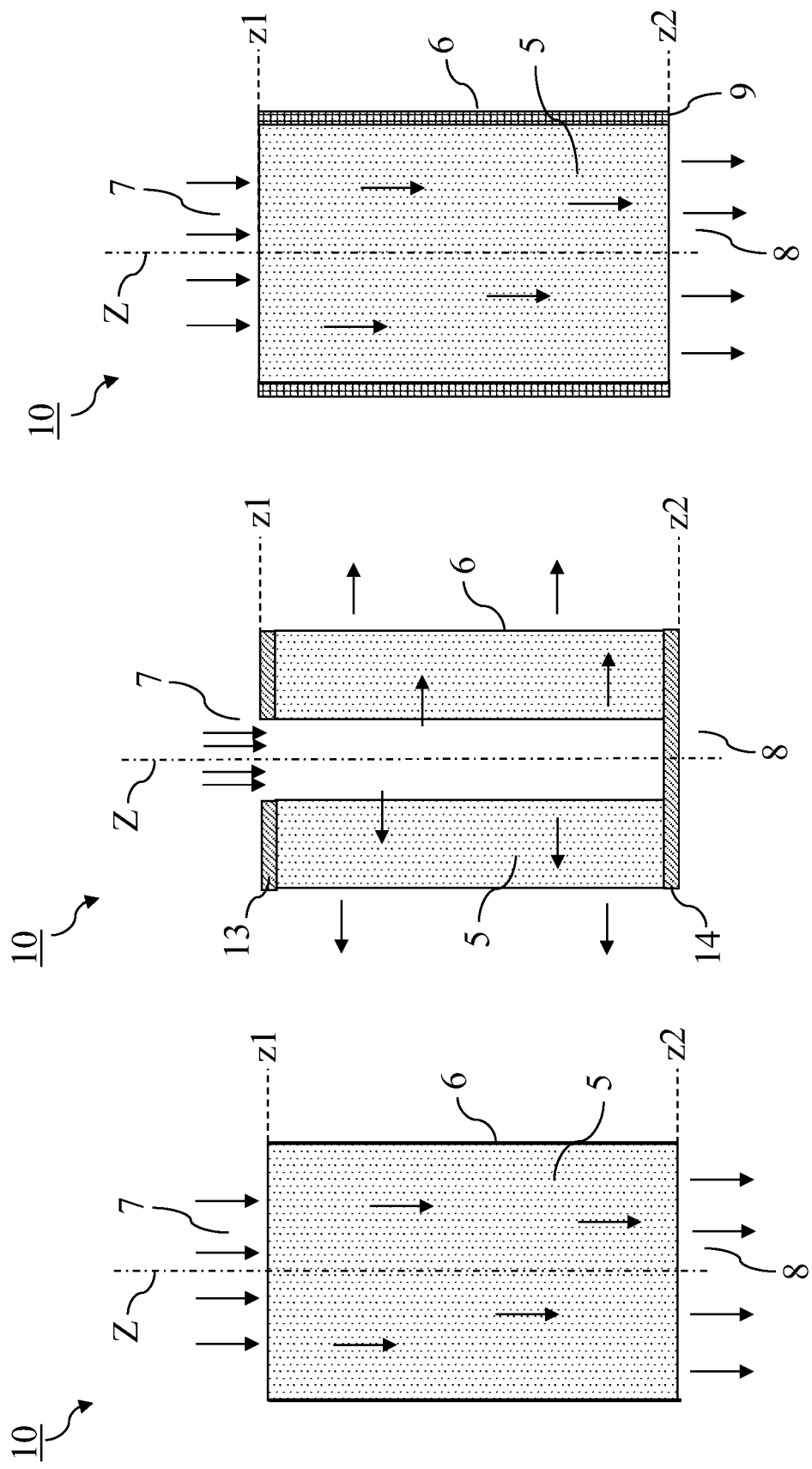

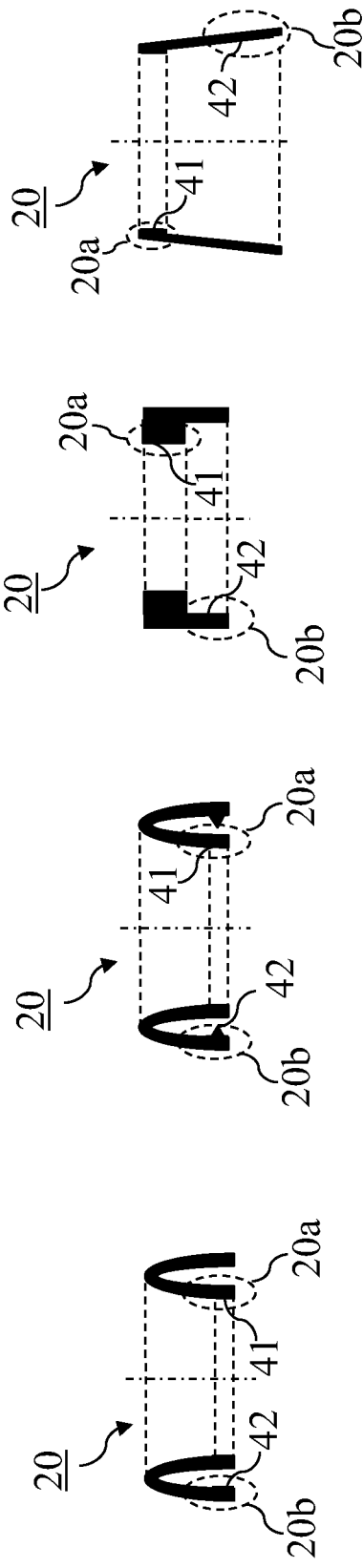
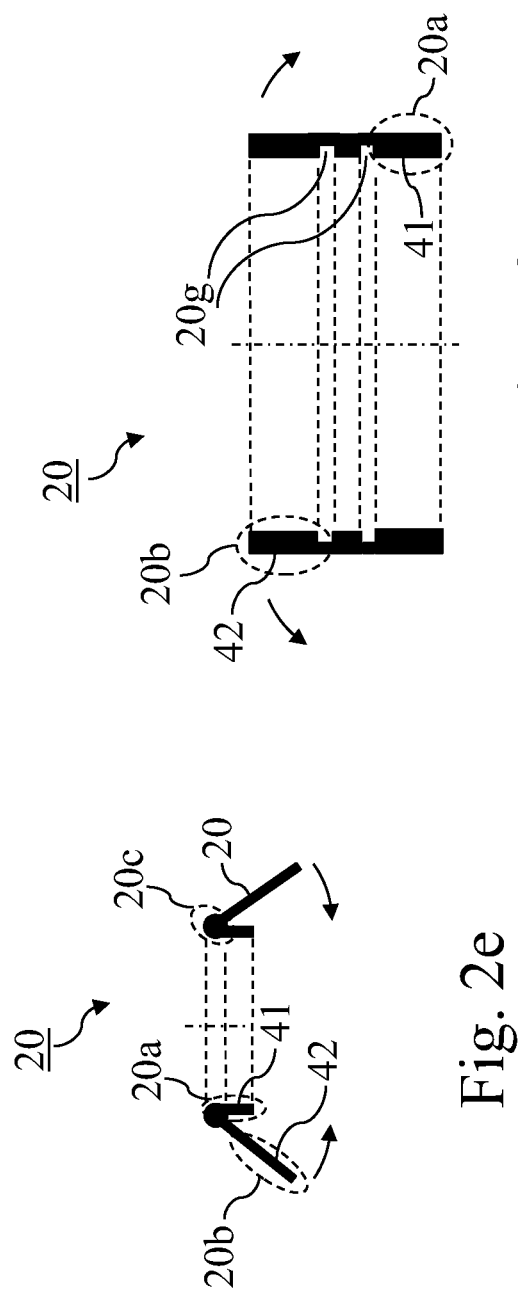

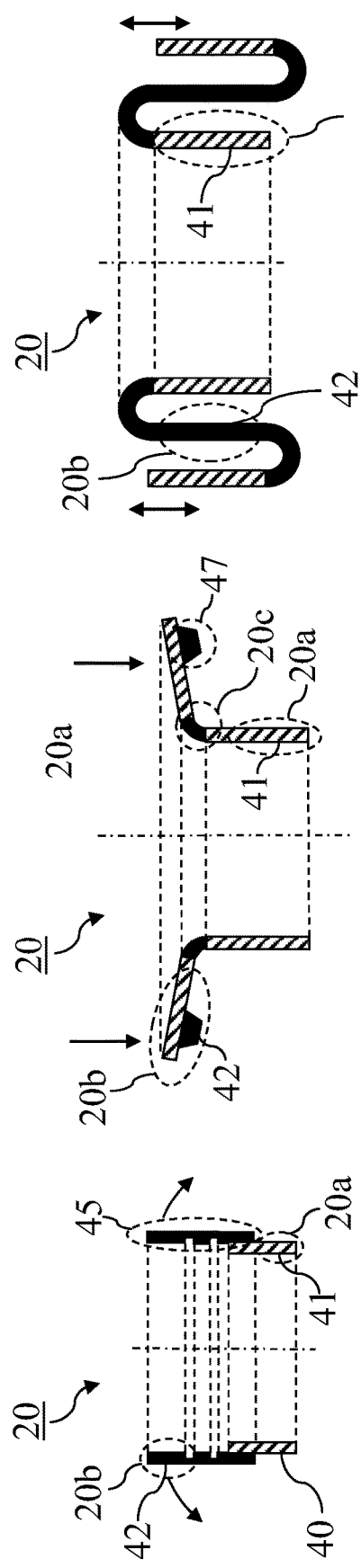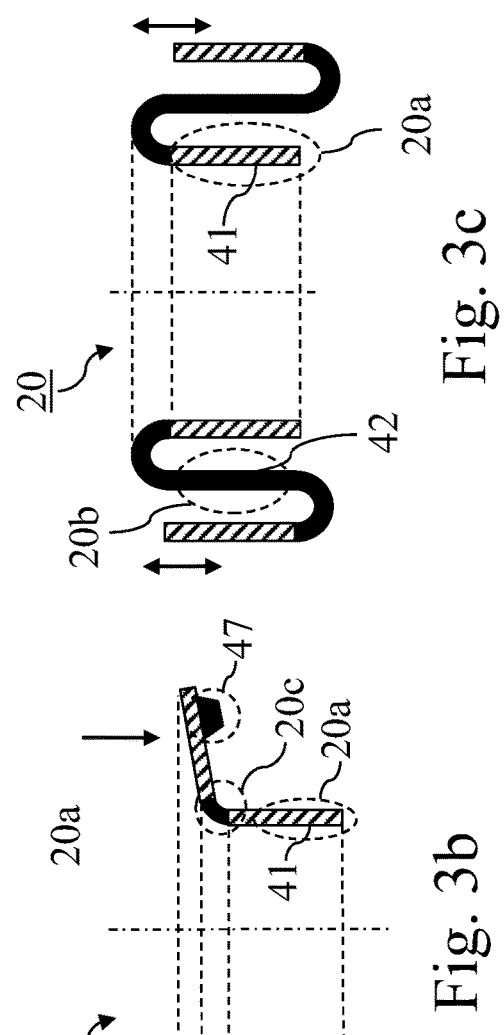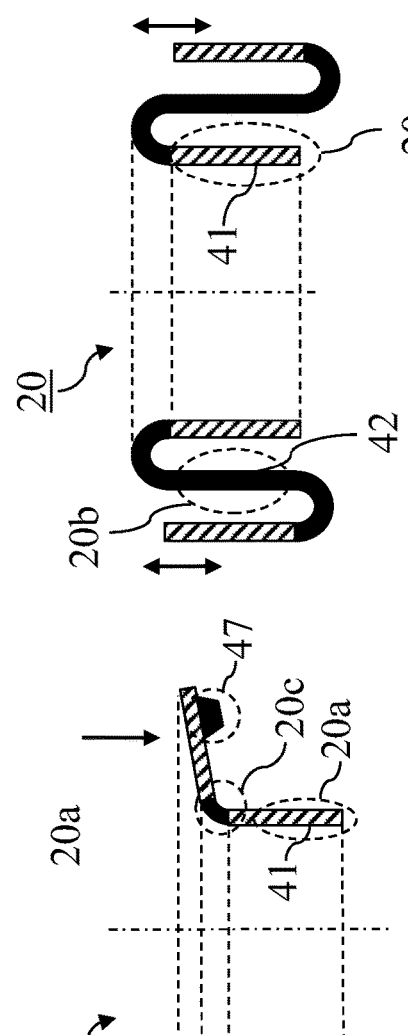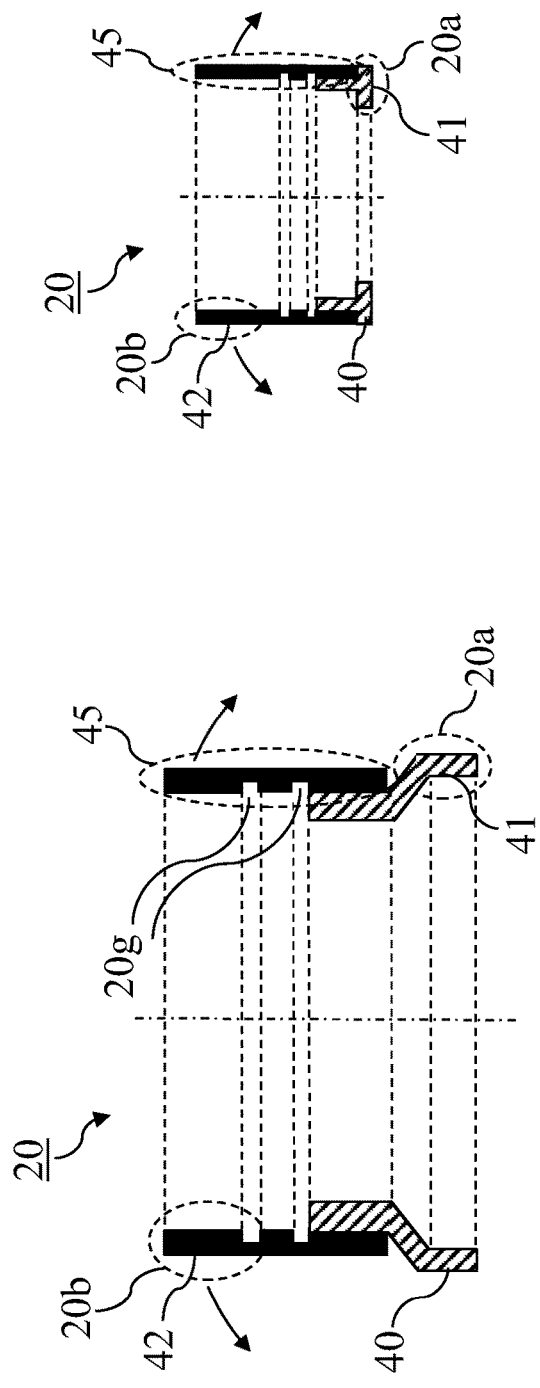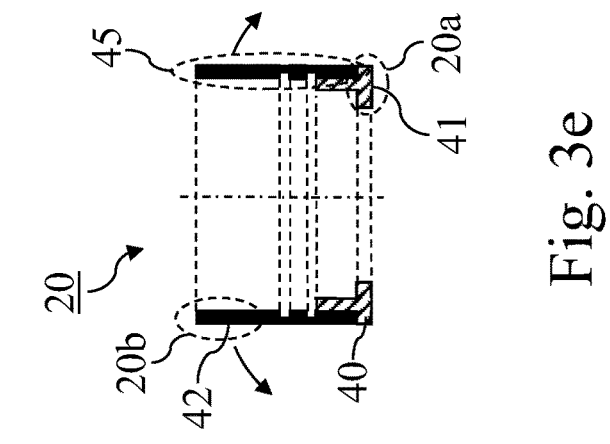

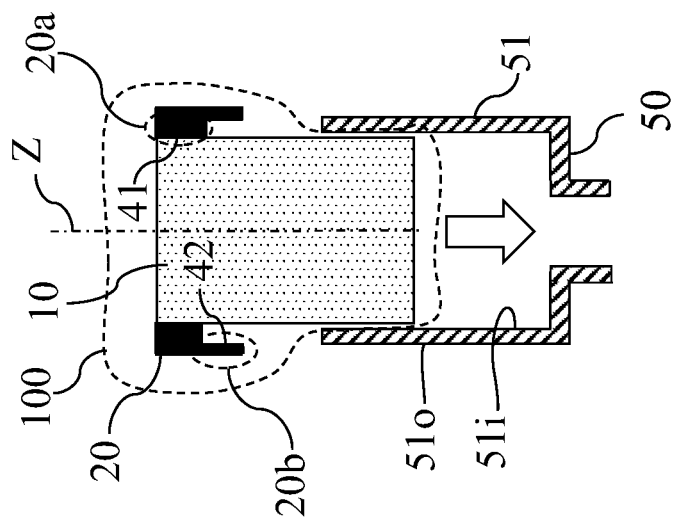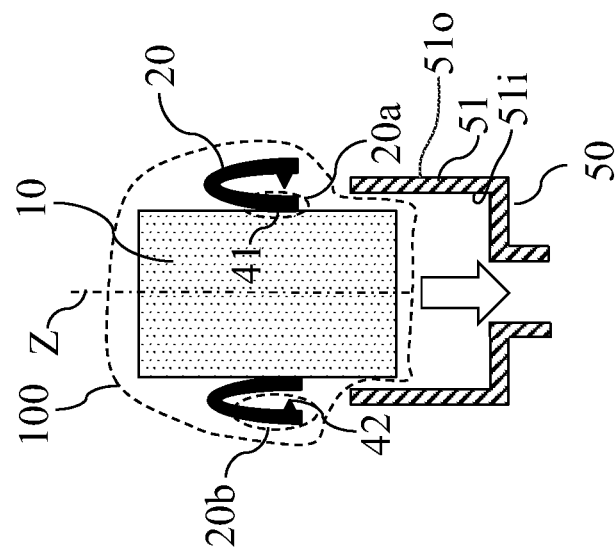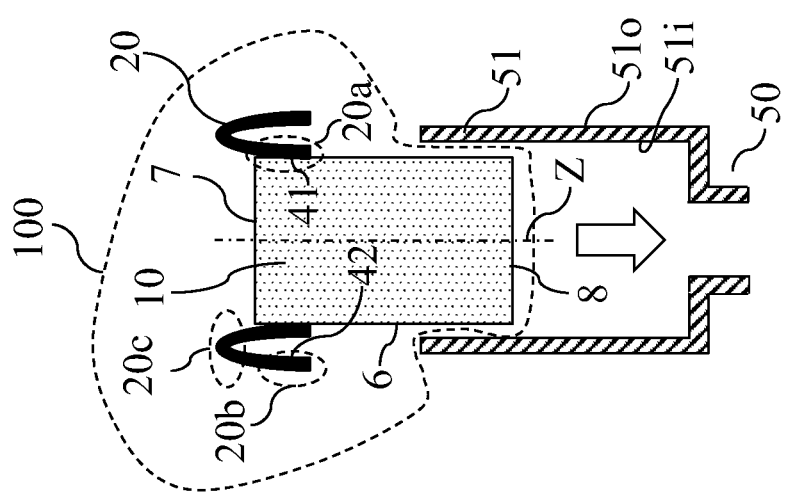

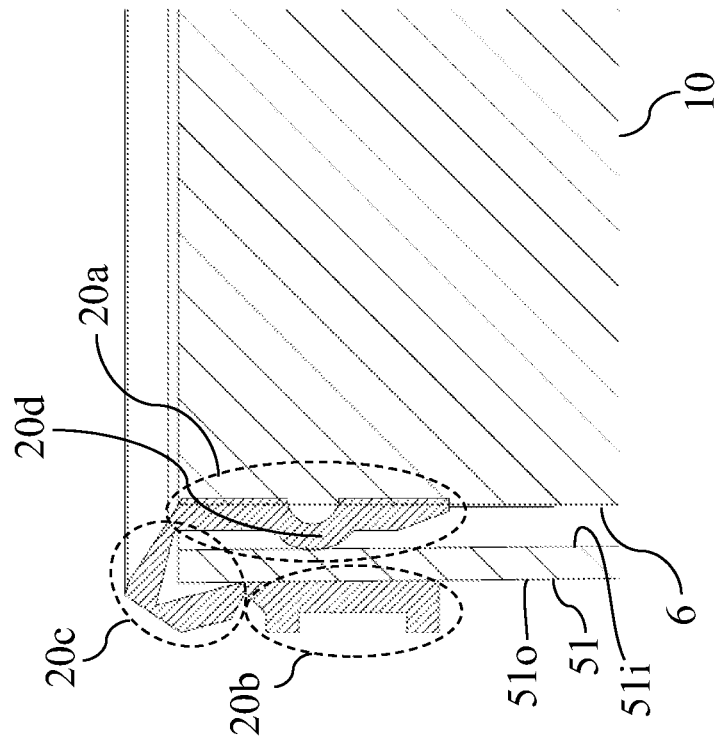
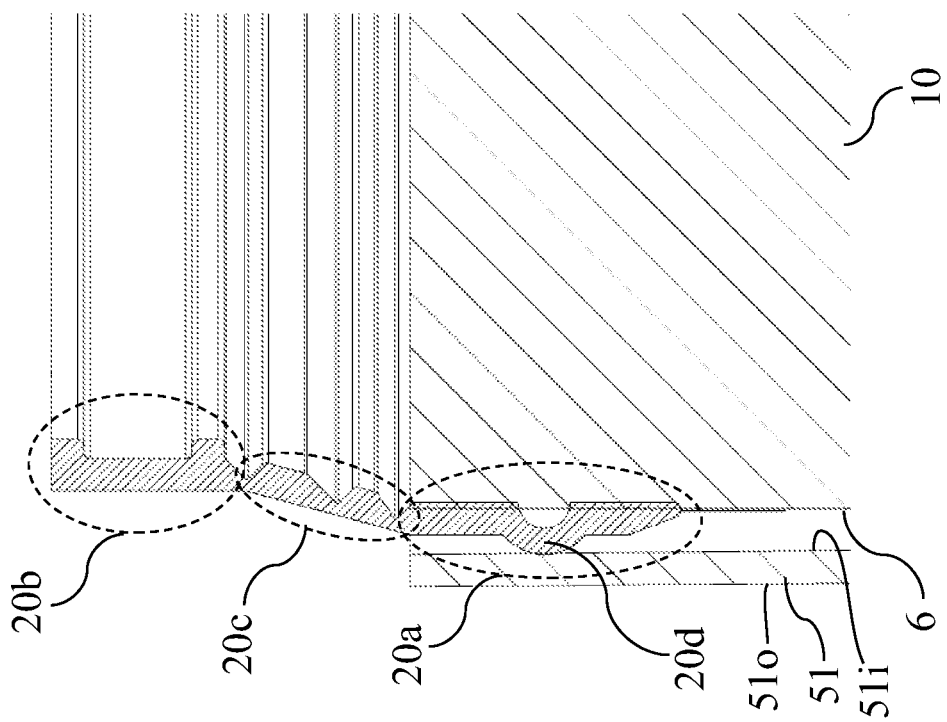
Fig. 11b
Fig. 11a

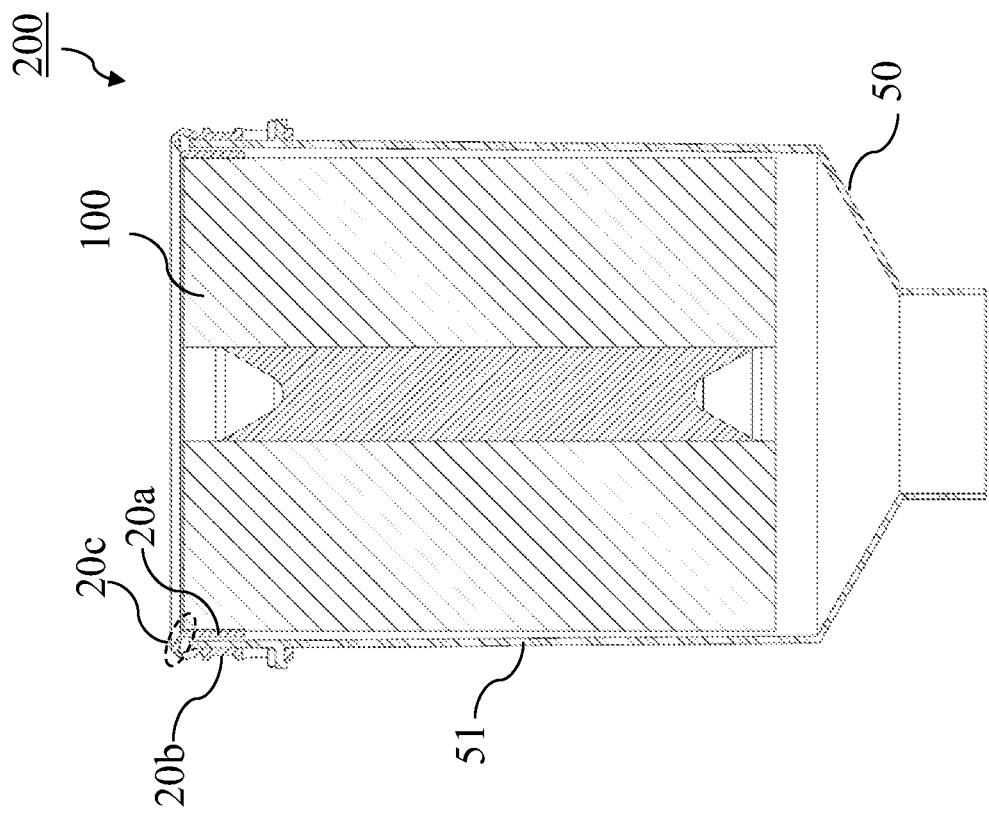
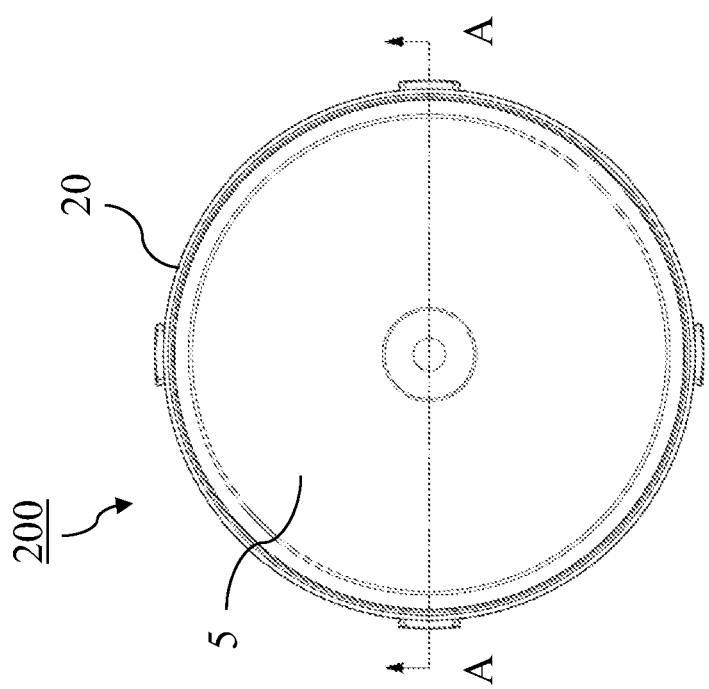
Fig. 15b
Fig. 15a

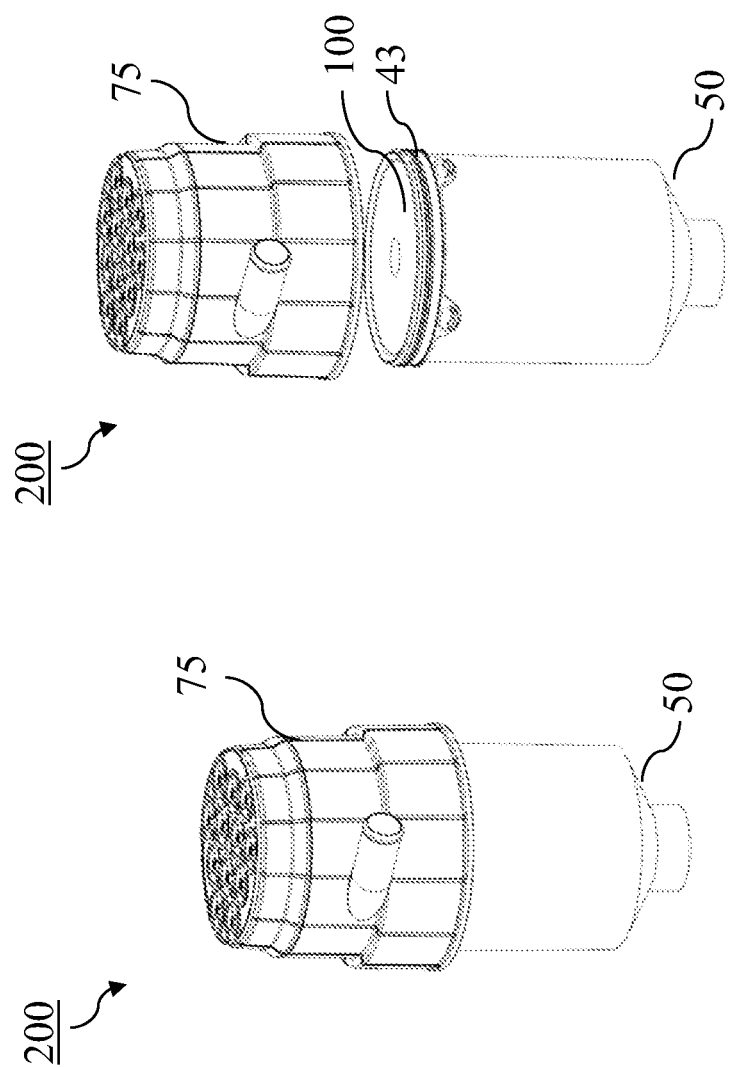

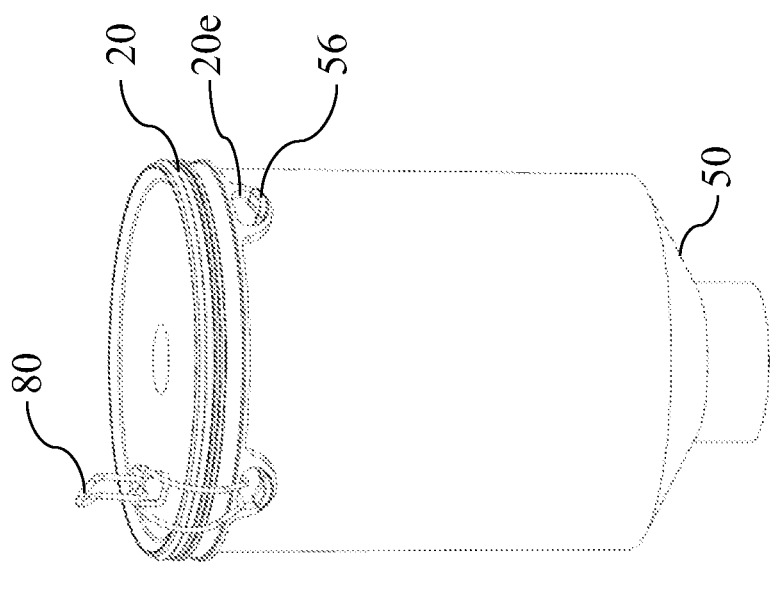

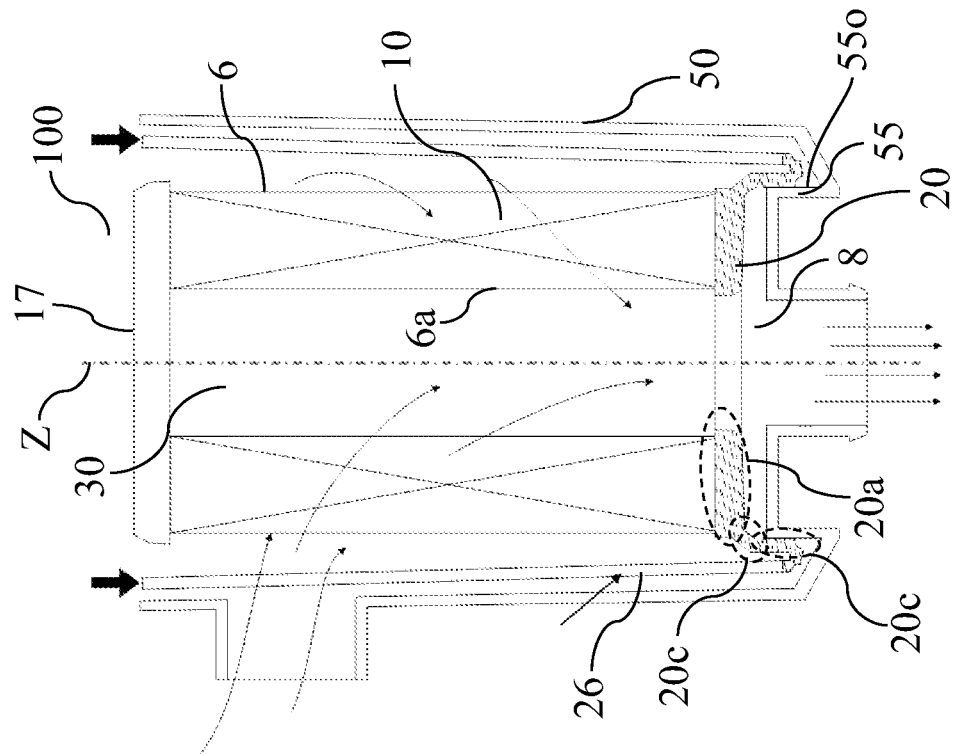
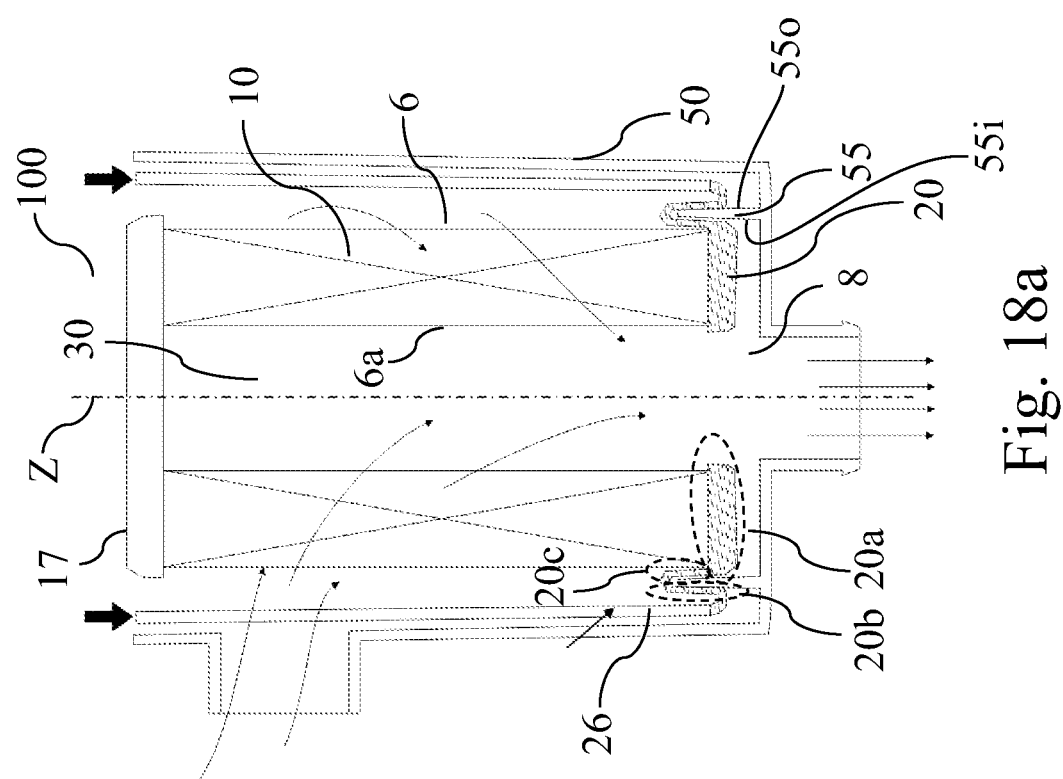
Fig. 18a
Fig. 18b ofa fThis application is a National Stage Application of PCT International Patent application No. PCT/US2020/012750, filed Jan. 8, 2020, which claims the benefit of priority to European Patent Application No. 19150836.5, filed Jan. 8, 2019, which applications are incorporated herein by reference. To the extent appropriate, a claim of priority is made to each of the above disclosed applications.

FILTER ELEMENT AND METHOD FOR SERVICING A FILTER SYSTEM

FIELD OF THE DISCLOSURE

The present disclosure relates to a filter element. More specifically it relates to a filter element that can be inserted into a housing of a filter system and can be removed for servicing. The disclosure is also related to a method for servicing a filter system.

BACKGROUND

Filter elements for filtering a fluid, also named filter cartridges, are used for a wide variety of filtering applications. The fluid can be a liquid or a gas, e.g. air.

Indeed, in many instances, it is desired to filter contaminant material from a fluid stream. For example, airflow streams to engines for motorized vehicles or for power generation equipment, construction equipment or other equipment, gas streams to gas turbine systems and air streams to various combustion furnaces, carry particulate contaminant therein. It is preferred for such systems that contaminant materials be removed from the fluid or at least be reduced.

The filter element can be construed as an element that is to be removed and replaced from a housing of the filter system at regular time intervals or when the filtering performance has dropped below a critical threshold level.

Generally, the filter element comprises a filter medium pack including a filter medium. The filter medium, also named filter body, removes contaminant materials when the fluid flows through the filter medium. Commonly used and commercially available filter media are for example pleated media or fluted media. The fluted media are also named Z-type media.

An example of a filter medium pack comprising fluted medium is described in U.S. Pat. No. 7,396,376. The filter medium pack generally comprises a circumferential side forming a radial boundary of the filter medium pack. The circumferential side of the filter medium pack can have various shapes depending on the overall shape of the filter medium pack. If the filter medium pack has for example a cylindrical shape then the circumferential side of the filter medium pack corresponds to the outer side of the cylinder.

The shape and size of the filter medium pack is also designed in accordance with the corresponding housing the filter medium pack has to fit with.

For proper operation of a filter element, it is essential that the filter medium pack is properly sealed to the housing wherein the filter medium pack is inserted. Various types of seals for a filter element have been proposed.

A first example of a seal type for a filter element is a so-called reversed radial seal, also named outwardly directed radial seal that is, for example, made of polyurethane (PU) and positioned radially around a filter medium pack, e.g. a pack including stacked or wound fluted media. The seal is generally supported by a seal frame to provide strength to the seal and to compensate for the irregular shape of the filter medium pack. In order to use an air filter element comprising a reversed radial seal, the housing of the filter device is provided with an inner radial wall part that is dimensioned such that when the filter element is inserted in the housing a radial edge of the reversed radial seal is compressed against and thereby forms a sealed contact with the inner radial wall part of the housing. An example of an outer radial seal is for example disclosed in U.S. Pat. No. 7,396,376.

A second example of a seal type for a filter element is an inwardly directed radial seal used for example in combination with a cylindrical filter medium pack, e.g. a pack including pleated media. The inwardly directed radial seal is for example radially positioned inside a hollow part of the cylinder that is forming the filter medium pack. For using these type of inwardly directed radial seals, the housing of the filter system comprises a tube element dimensioned such that when the filter element is inserted in the housing a radial edge of the inwardly directed radial seal is compressed to form a sealed contact with an outer surface of the tube element located inside the housing.

A disadvantage of the filter elements known in the art is that the seal, e.g. a reversed radial seal or an inwardly directed radial seal as discussed above, needs to be manufactured with a high precision. Similarly, the housing of the filter system and especially the inwardly directed radial surface where the seal is making contact, i.e. the sealing surface, needs to be manufactured with high precision and generally in accordance with the dimensions of the seal. Indeed, an imperfect fitting of the seal within the housing can lead to fluid leaks. Moreover, for applications where the filter system is an air filter system used for motorized vehicles, such as for example agriculture vehicles or trucks, the filter seals need to be robust as they can be exposed to heavy vibrations.

As a result of the severe engineering tolerances imposed, the manufacturing process of the filter element and the associated housing is expensive and time consuming.

SUMMARY

It is an object of the present disclosure to provide a filter element for filtering fluids that is robust and can be manufactured in a cost-effective way.

A further object of embodiments of the disclosure is that the filter element may be used with a housing of a filter system wherein engineering tolerances with respect to a sealing surface of the housing interfacing with the seal of the filter element can be relaxed.

According to an aspect of the present disclosure a filter element is provided for filtering a fluid comprising a filter medium pack extending along a longitudinal axis from a first end to a second end and having an axial inlet side at the first end for receiving unfiltered fluid and a circumferential side forming a radial boundary of the filter medium pack. The filter medium pack is configured for insertion into a housing so as to enclose or partly enclose the circumferential side of the filter medium pack with an outer sidewall of the housing.

The filter element according to the present disclosure comprises a bridge seal arrangement for sealingly bridging a gap between the radial boundary of the filter medium pack and the outer sidewall of the housing. The bridge seal arrangement has a first collar-shaped portion and a second collar-shaped portion coupled with the first collar-shaped portion, and wherein the first collar-shaped portion comprises a first circumferential sealing surface sealingly coupled to the circumferential side of the filter medium pack or sealingly coupled to a border of the axial inlet side, and wherein the second collar-shaped portion comprises a second circumferential sealing surface configured for encircling and sealingly cooperating with the outer sidewall of the housing.

The present disclosure is not limited to a particular fluid. Preferably the fluid is a gas, such as for example air. The disclosure is also not limited to a particular filter medium. For example, filter elements according to the present disclosure comprise a filter medium pack including a filter medium such as a fluted filter medium or a pleated filter medium or any other filter medium suitable for filtering the fluid. The filter medium pack can also have various shapes and the disclosure is not limited to any particular shape, indeed the cross-section between the circumferential side of a filter medium pack and a plane perpendicular to the longitudinal axis can for instance have a shape of a circle, an oval, an ellipse, a rounded square, obround, or any other shape.

Advantageously, by providing a bridge seal arrangement having the first and the second collar-shaped portions, a degree of decoupling is maintained between the filter element and the housing. In this way, the filter element can move/vibrate within the housing without risk of creating any leaks, making the filter element more robust.

Advantageously, by sealingly coupling the first circumferential sealing surface of the first collar-shaped portion to the circumferential side of the filter medium pack or to a border of the axial inlet side, there is no need to provide for a seal support frame or provide for a coupling element as is the case with filter seals known in the art. As a consequence, the filter element according to the disclosure can fit into a housing having a reduced inner diameter, allowing to make the housing of the filter system more compact.

Advantageously, by providing the second collar-shaped portion comprising a second circumferential sealing surface configured for encircling and sealingly cooperating with the outer sidewall of the housing, less precision is needed to manufacture the housing, especially tolerances with respect to the sealing surface of the housing can be relaxed. In this way, cheaper tools for manufacturing can be used as the impact of warpage on the plastic walls of the housing is reduced.

A further advantage of aspects of the disclosure is that with a filter element comprising the bridge seal arrangement, the remote sealing surface, i.e. the second circumferential sealing surface of the second collar-shaped portion, is sealing at an outer sidewall of the housing. Advantageously, this outer sidewall can have a non-regular shape, e.g. a drop shape or any other shape that can be contoured by the second circumferential sealing surface of the second collar-shaped portion.

In embodiments, the second collar-shaped portion of the bridge seal arrangement comprises an inwardly protruding portion configured for fitting and/or sealingly cooperating with an indentation portion of the outer sidewall of the housing. In this way, an orientation to the filter element with respect to the housing can be provided.

In embodiments, a glue is coupling the first circumferential sealing surface to the circumferential side or to the border of the axial inlet side. Alternatively, other fixation means can be used as well.

In embodiments according to the present disclosure, the bridge seal arrangement is configured such that the second collar-shaped portion is elastically deformed when positioned around the outer sidewall of the housing such that an opposing radial force is developed for pressing the second circumferential sealing surface against the outer sidewall of the housing. Indeed, as known in the art, when applying a stress to an elastic material, an opposing force is developed that reacts against the deformation. The second collar-shaped portion is preferably made out of an elastomer.

An elastomer is a polymer with the property of elasticity, i.e. it is a polymer that deforms under stress and returns to its original shape when the stress is removed. Embodiments of the bridge seal arrangement according to the present disclosure make use of the elastic property of an elastomer. An elastic body can be elastically deformed in various ways, for example by stretching the body, i.e. making the body longer or wider, or by flexing the body, i.e. bending/folding the body or bending/folding parts of the body, or by applying a combination of stretching and flexing/folding. When the wording elastomer is used throughout this specification, it includes all materials that fall under the elastomer classification. For example, an elastomer includes all synthetic rubbers and natural rubbers.

Generally, to generate an elastic deformation of the second collar-shaped portion, the second collar-shaped portion is to be stretched and/or flexed. For example, in embodiments, the bridge seal arrangement is configured for moving the second collar-shaped portion with respect to the first collar-shaped portion from a first position, also named un-sealed position to a second position, also named sealed position and vice-versa. When making this movement from the un-sealed to the sealed position, at least the second collar-shaped portion is being stretched and/or being flexed. Due to this stretching and/or flexing of the second collar shaped portion an elastic deformation is generated.

Preferably, the bridge seal arrangement of the filter element according to the disclosure is configured such that when moving the second collar-shaped portion from the un-sealed to the sealed position, a radial opposing force is developed and is pressing automatically/intrinsically the second circumferential sealing surface against the outer sidewall of the housing. In this way, a secured sealing is obtained.

In embodiments, the filter element comprises a bridge seal arrangement having one or more folding lines configured for facilitating the movement of the second collar-shaped portion between the sealed and the un-sealed position.

In a particular embodiment, the filter element comprises a bridge seal arrangement having a rigid guiding element attached to the second collar-shaped portion for facilitating the moving of the second collar-shaped portion between the sealed and un-sealed position.

In embodiments wherein the bridge seal arrangement is configured for moving the second collar-shaped portion from a first un-sealed position to a second sealed position, the second circumferential sealing surface is forming a radially outward-facing circumferential surface and a radially inward-facing circumferential surface when in respectively the first position, i.e. the un-sealed position, and the second position, i.e. the sealed position.

In embodiments, the filter element comprises a fixation clamp positioned around the second collar-shaped portion and configured for pressing the second circumferential sealing surface against the outer sidewall of the housing. The fixation clamp can advantageously be used when the second collar-shaped portion is not stressed and/or flexed or only poorly stressed and/or poorly flexed when in the sealed position such that there is no sufficient opposing radial force automatically/intrinsically generated as discussed above for providing a sealed connection. Applying a fixation clamp or another fixation means to the second collar-shaped portion is necessary when the second collar-shaped portion is non-elastic and/or non-stretchable and/or non-flexible.

In embodiments, the first collar-shaped portion is for example made out of a rigid material such as plastic or a metal. In other embodiments, the first collar-shaped portion is made of or is partly made out of any of the following materials: an elastomer such as synthetic rubber or natural rubber, a thermoplastic elastomer (TPE), a thermoset elastomer, a thermoplastic vulcanizate (TPV), a polymer such as polyurethane (PU) or a combination of any of these materials. An example of a synthetic rubber is EPDM rubber (ethylene propylene diene monomer rubber). In embodiments, the first collar-shaped portion can also be made partly from a rigid material and partly from an elastomer.

The second collar-shaped portion is preferably made out of or partly made out of any of the following materials: an elastomer such as synthetic rubber or natural rubber, a thermoplastic elastomer, a thermoset elastomer, a thermoplastic vulcanizate, an ethylene propylene diene monomer rubber, a polymer such as polyurethane, or a combination of any of these materials.

In embodiments, the bridge seal arrangement of the filter element according to the disclosure comprises a bridging portion coupling the second collar-shaped portion with the first collar-shaped portion. This bridging portion improves the decoupling between the filter element and the housing.

In a particular embodiment, the first collar-shaped portion and the second collar-shaped portion are forming a coupled body made out of a single material, preferably made out of any of the following materials: an elastomer such as synthetic rubber or natural rubber, a thermoplastic elastomer, a thermoset elastomer, a thermoplastic vulcanizate, an ethylene propylene diene monomer rubber, a polymer such as polyurethane, or a combination of any of these materials.

In further embodiments, the bridge seal arrangement according to the present disclosure comprises an elastic and stretchable band wherein the first collar-shaped portion and the second collar-shaped portion correspond to respectively a lower and an upper portion of the elastic and stretchable band.

In embodiments, besides the axial inlet side at the first end, the filter medium pack has an axial outlet side at the second end for outputting filtered fluid. In alternative embodiments, besides the axial inlet side at the first end, the filter medium pack has a closed flange located at the second end of the filter medium pack and the circumferential side is configured for outputting filtered fluid.

In embodiments, the bridge seal arrangement comprises one or more handles associated to the second collar-shaped portion. The handles can for example be attached to the second collar-shaped portion or alternatively, the handles can be integrated in the second collar-shaped portion by for example providing openings through the second collar-shaped portion. Advantageously, these handles allow to remove the filter element from the housing. Further, by providing one or more protruding elements to the external surface of the housing, the handles can be coupled to the corresponding protruding elements so as to keep the collar-shaped seal in position.

In embodiments, the border of the axial inlet side corresponds to a circumferential surface portion of the axial inlet side. In other embodiments, the border of the axial inlet side corresponds to a peripheral radial edge area of the axial inlet side.

In particular embodiments, the filter element according to the present disclosure is an air filter element, preferably suitable for an air intake system of a combustion engine.

According to an aspect of the present disclosure, a filter system comprising a housing and a filter element as described above is provided. The housing comprises an outer sidewall enclosing or partly enclosing the circumferential side of the filter medium pack and the second circumferential sealing surface is encircling and sealingly cooperating with the outer sidewall of the housing. Thereby, preferably, the gap between the outer perimeter of the media pack and an outer sidewall of the housing is completely bridged, i.e. sealed. Thereby, preferably, at least part of the inflow surface of the media pack is completely hermetically separated from the outflow surface of the filter element, being separated from one another by the housing, or part of the housing, and the bridge seal arrangement. In this way, the only fluid passage from the inflow to the outflow surface is through the intra-filter media connection. Advantageously, filtered fluid is not being polluted with unfiltered fluid.

In embodiments, the outer sidewall of the housing is adapted to cooperate with the second circumferential sealing surface. For example, for filter elements wherein the second collar-shaped portion comprises a sealing rib having a radial surface forming the second circumferential sealing surface, a groove can be provided to the outer sidewall of the housing to cooperate with the sealing rib.

In embodiments, the filter system comprises a pre-cleaner for pre-cleaning the unfiltered fluid before entering the filter medium pack. Such a pre-cleaner is removably coupled to the housing and in embodiments according to the present disclosure, the second collar-shaped portion comprises a third circumferential sealing surface configured for cooperating with an inner surface of said pre-cleaner. In this way, the pre-cleaner can be installed without the need for an additional seal.

In particular embodiments, the filter system comprises a housing having an outer sidewall enclosing or partly enclosing the circumferential side of the filter medium pack, and wherein one or more protruding elements are provided to the outer sidewall of the housing. In this way, when a bridge seal arrangement is used comprising one or more handles coupled to the second collar-shaped portion, as discussed above, each of the one or more handles can be coupled to a corresponding protruding element. Advantageously, with the handles coupled to the protruding elements of the housing, the bridge seal arrangement is kept in place.

In further particular embodiments, the filter system comprises one or more latches for latching a pre-cleaner or a filter cover to the housing. Preferably, for bridge seal arrangements comprising one or more handles coupled to the second collar-shaped portion, as discussed above, each of the one or more latches is coupled with a corresponding handle of the one or more handles of said bridge seal arrangement. In this way, no specific additional elements, such as protruding elements, need to be provided to the outer wall of the housing to interface with the latches.

According to an aspect of the present disclosure, a method of servicing a filter system is provided as disclosed in the appended claims.

According to a further aspect of the present disclosure, a filter element for filtering a fluid is provided comprising a filter medium pack extending along a longitudinal axis and having a first axial side and a second axial side forming an axial boundary of the filter medium pack, and a circumferential side forming a radial boundary of the filter medium pack; and wherein the filter element comprises a bridge seal arrangement having a first ring-shaped or collar-shaped portion comprising a first circumferential sealing surface sealingly coupled to the circumferential side or sealingly coupled to a border of the second axial side, and a second collar-shaped portion coupled with the first collar-shaped portion, and wherein the second collar-shaped portion comprises a second circumferential sealing surface configured for encircling and sealingly cooperating with an outer surface of a tube-shaped wall portion located inside the housing of a filter system. This wall portion is not necessarily a cylindrical tube-shaped portion but it can have any shape including irregular shapes such as a drop shape.

In embodiments, the bridge seal arrangement comprises a liner element coupled to the collar-shaped portion. The liner element facilitates to insert the filter element in the housing and to maintain a firm sealing contact.

In embodiments, the filter medium pack includes an annular filter medium radially delimited by an outer side and an inner side, and wherein the outer side is permeable for receiving unfiltered liquid and the outer side is corresponding to the circumferential side of the filter medium pack. The inner side is configured for outputting filtered liquid into a cavity of the annular filter medium and a flange is closing the first axial side of the filter medium pack. In this embodiment, the second axial side of the filter medium pack is configured for evacuating filtered liquid from the cavity.

According to an aspect of the disclosure a filter system comprising a filter element and a housing comprising an outer sidewall enclosing or partly enclosing the circumferential side of the filter medium pack, and a tube-shaped wall portion located inside the housing and wherein the second circumferential sealing surface of the second collar-shaped portion is encircling and sealingly cooperating with a surface of the tube-shaped wall portion located inside the housing.

According to a further aspect of the disclosure, a housing for a filter element is provided. The housing comprises a tube-shaped wall portion located inside the housing and wherein a radial outer surface of the tube-shaped wall portion is configured for forming an internal sealing surface for cooperating with a collar-shaped portion of a bridge seal arrangement.

SHORT DESCRIPTION OF THE DRAWINGS

These and further aspects of the disclosure will be explained in greater detail by way of example and with reference to the accompanying drawings in which:

FIG. 1a presents a schematic cross-sectional view of a first embodiment of a filter medium pack usable in a filter element according to the present disclosure.

FIG. 1b presents a schematic cross-sectional view of a second embodiment of a filter medium pack usable in a filter element according to the present disclosure.

FIG. 1c presents a schematic cross-sectional view of a third embodiment of a filter medium pack usable in a filter element according to the present disclosure.

FIGS. 2a to 2f schematically present cross-sections of various embodiments of a bridge seal arrangement according to the present disclosure.

FIGS. 3a to 3e schematically present cross-sections of various embodiments of a bridge seal arrangement according to the present disclosure wherein the bridge seal arrangement comprises parts made of different materials.

FIGS. 4a to 4f schematically show cross-sections of various embodiments of a filter element insertable in a housing.

FIGS. 5a to 5e schematically show cross-sections of various embodiments of a filter element insertable in a housing and wherein the bridge seal arrangement is foldable between an un-sealed and a sealed position, FIGS. 6a to 6e present cross-sections of various embodiments of a filter element according to the present disclosure wherein a bridge seal arrangement is bridging a gap between the radial boundary of the filter medium pack and the outer sidewall of a housing.

FIG. 7a presents a more detailed view of a part of the filter element shown on FIG. 2a.

FIG. 7b presents a cross-section of an embodiment of a bridge seal arrangement according to the disclosure wherein a fixation clamp is positioned around a second collar-shaped portion of the bridge seal arrangement.

FIG. 7c presents a cross-section of an embodiment of an air filter element comprising a bridge seal arrangement useable with a pre-cleaner or a cover.

FIG. 8a presents a cross-section of an embodiment of a bridge seal arrangement according to the present disclosure comprising a rigid guiding element for facilitating the moving between a sealed and un-sealed position.

FIG. 8b presents a cross-section of an embodiment of a bridge seal arrangement wherein an installation tool is used.

FIG. 9a presents a cross-section of a part of a filter element according to the present disclosure wherein an inwardly protruding portion of the bridge seal arrangement is cooperating with an indentation portion of an outer sidewall of a housing.

FIG. 9b presents a cross-section of a part of a filter element according to the present disclosure wherein four inwardly protruding portions of the bridge seal arrangement are cooperating with four indentation portions of an outer sidewall of a housing.

FIG. 10a presents a cross-section of an air filter element according to the disclosure comprising a foldable and stretchable bridge seal arrangement.

FIG. 10b presents a cross-section of an air filter element wherein the air filter medium pack comprises an outer shell.

FIG. 11a shows a perspective view of a part of an elastic bridge seal arrangement in an un-sealed position.

FIG. 11b shows a perspective view of a part of an elastic bridge seal arrangement that is folded and stretched into a sealed position.

Figure 12:
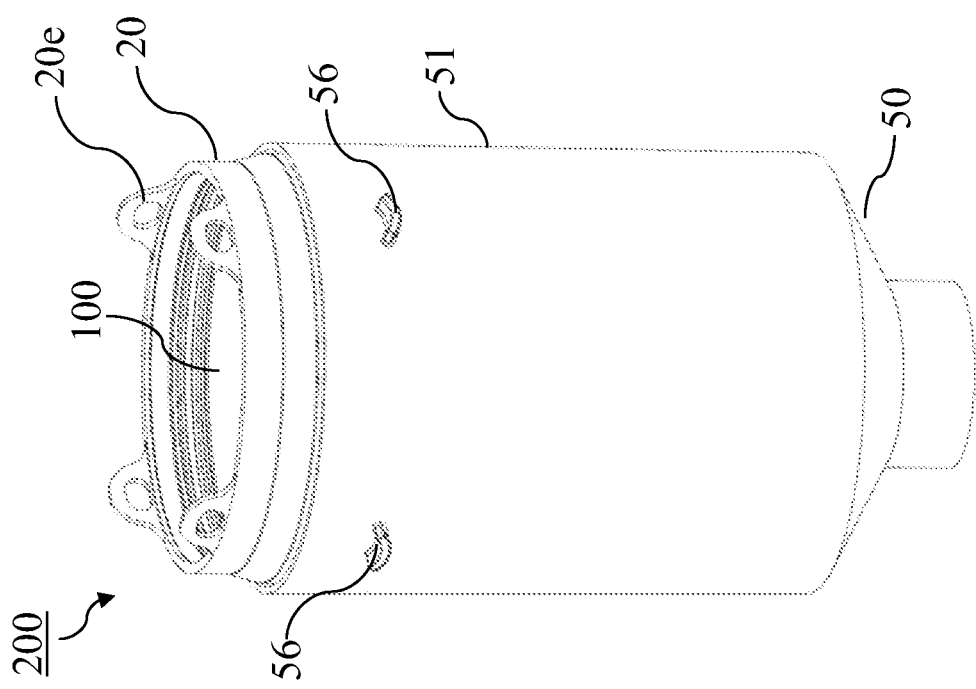

FIG. 12 presents a perspective view of an example of air filter system comprising an air filter element and a housing.

Figure 13:
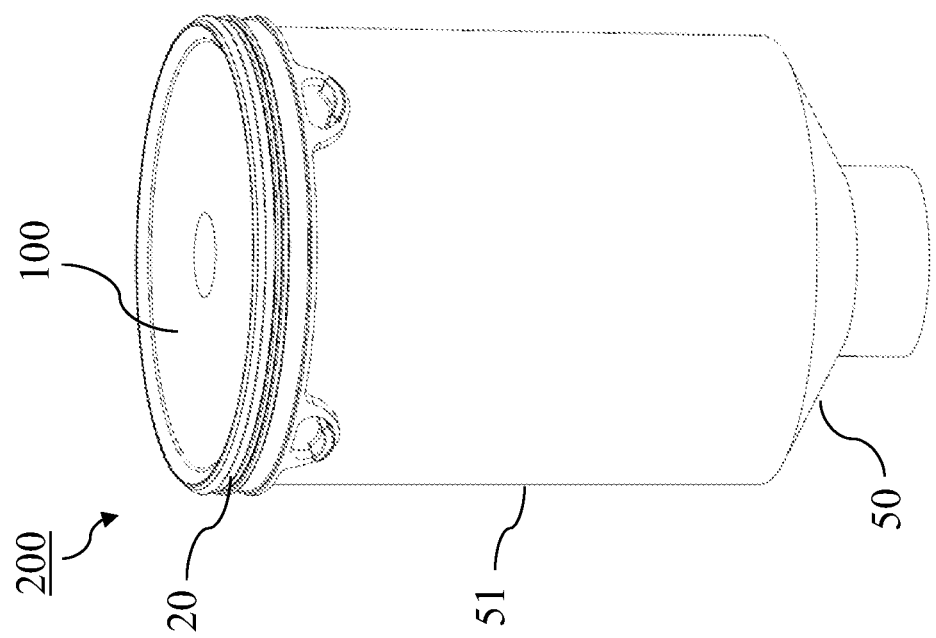

FIG. 13 presents a perspective view of an air filter system wherein the air filter element is sealed to the housing.

Figure 14B:
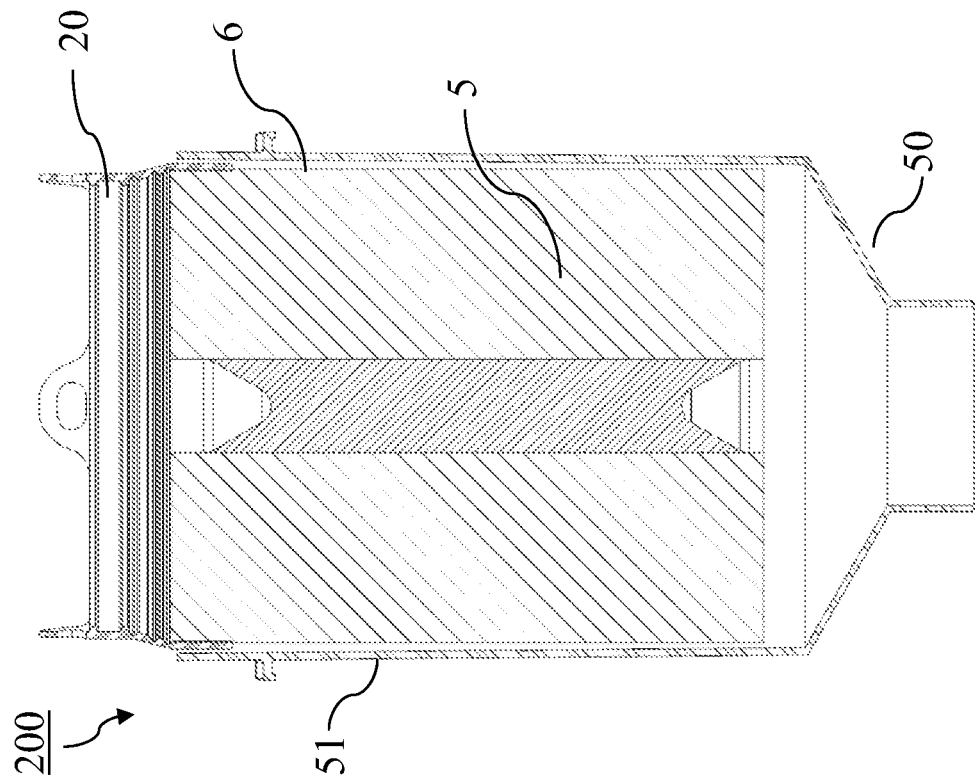
Figure 14A:
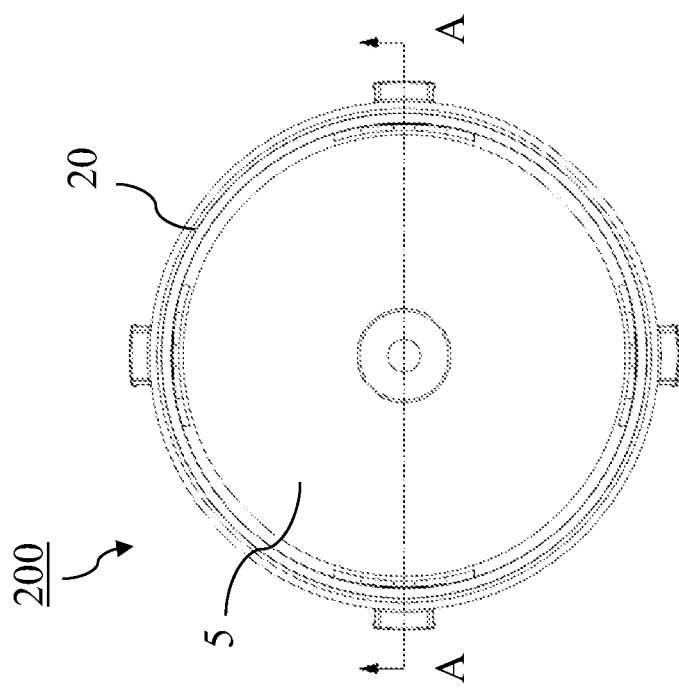

FIG. 14a presents a top view of an air filter system wherein the bridge seal arrangement is in an unsealed position.

FIG. 14b presents a cross sectional view of the air filter system of FIG. 14a with respect to the plane A.

FIG. 15a presents a top view of an air filter system wherein the bridge seal arrangement is in a sealed position.

FIG. 15b presents a cross sectional view of the air filter system of FIG. 15a with respect to the plane A.

FIG. 16a presents a perspective view of an air filter system comprising a pre-cleaner.

FIG. 16b shows an expanded view of the air filter system of FIG. 16a.

FIG. 17 presents a perspective view of an air filter system comprising a latch.

FIG. 18a presents a first example of air filter system comprising a housing and an air filter element having a filter medium pack configured for radial air flow.

FIG. 18b presents a second example of air filter system comprising a housing and an air filter element having a filter medium pack configured for radial air flow.

Figure 18D:
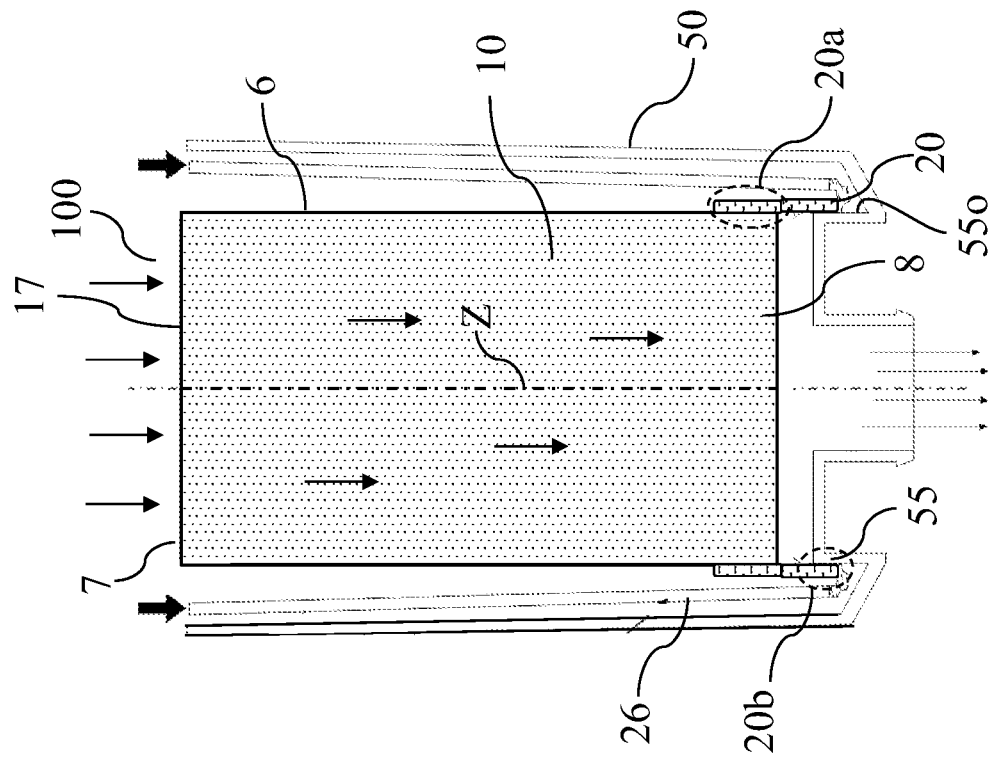
Figure 18C:
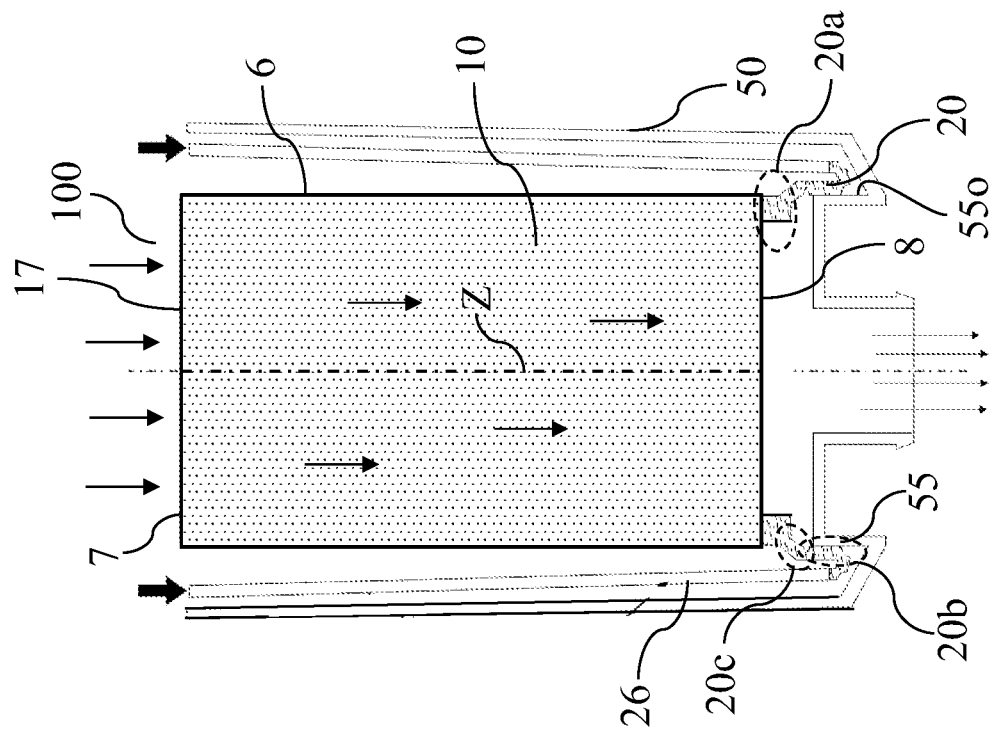

FIG. 18c presents an example of an air filter system comprising a housing and an air filter element having a filter medium pack configured for axial air flow.

FIG. 18d presents a further example of an air filter system comprising a housing and an air filter element having a filter medium pack configured for axial air flow.

Figure 19B:
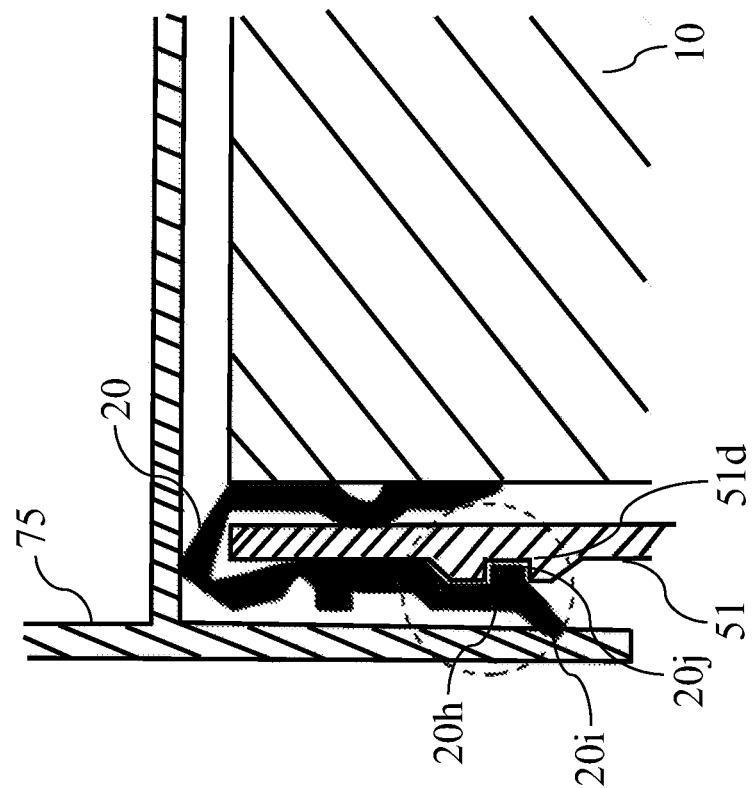
Figure 19A:
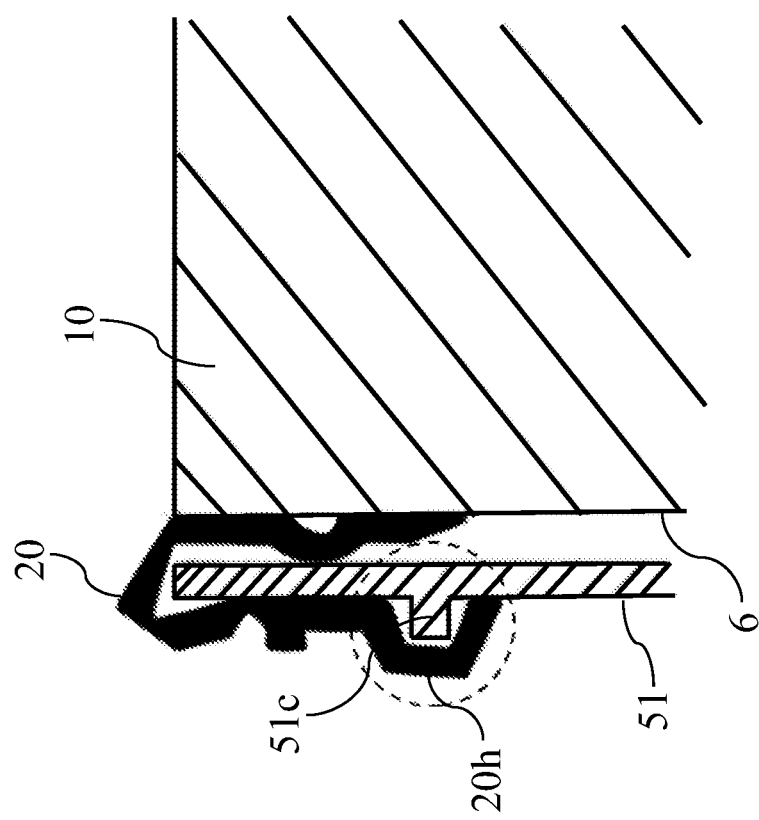

FIG. 19a and FIG. 19b schematically show cross-sections of embodiments of a filter element wherein the bridge seal comprises a circumferential engaging section configured for engaging with a matching circumferential section of the outer sidewall of the housing.

The Figures are not drawn to scale. Generally, identical components are denoted by the same reference numerals in the Figures.

DETAILED DESCRIPTION OF EMBODIMENTS

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

When the wording "collar" or "collar-shaped portion" is used throughout this specification, it can be construed as an element or part of an element configured for enclosing/contouring an element or object or for enclosing/contouring a circumferential wall of an element or object. The collar or collar-shaped portion is not limited to symmetric regular shapes such as shapes of a ring, a cylinder or an obround, but other irregular shapes for forming a contour around elements/objects or around circumferential walls having an irregular radial boundary are conceived as well. Hence, the collar or collar-shaped portion can also have an irregular shape. For example, if a wall having an indentation portion is to be contoured by the collar or by the collar-shaped portion, the collar can have a corresponding irregular shape, for example having a protruding portion, in order to fit with the indentation portion of the wall. Additionally, the shape of the collar or the collar-shaped portion can vary, for example variations can occur between a stretched or a non-stretched state of the collar or collar-shaped portion.

When the wording "coupled" or "sealingly coupled" is used for expressing for example a coupling between two surfaces or two elements, it can be construed as either a direct coupling or an indirect coupling. A direct coupling is a direct connection between for example the two surfaces to be coupled by pressing the two surface together with or without an adhesive in between, such as a glue. On the other hand, an indirect coupling involves the use of for example further additional intermediate elements for establishing the coupling between the two surfaces. The additional intermediate element can for example include additional surfaces that are pressed and/or glued together, or sealingly fixed together in any other way.

The wording "encircling" used herein is to be construed as encompassing, surrounding or forming a circle around something. For example, a sealing surface that is encircling the outer sidewall of a housing when in sealed position implies by definition that the sealing surface is encompassing an outer surface of the outer sidewall of the housing.

As discussed above, the filter element according to the present disclosure is a component for mounting in a housing of a filter system and comprises a filter medium pack wherein a filter medium catches particles and impurities that are present in an incoming fluid flow. Although a number of the drawings presented and discussed below are specifically addressing embodiments of a filter element for filtering air, the present disclosure is not limited to any specific fluid. The fluid is for example a gas such as air.

Filter Medium Packs, Generally

A filter medium pack for use in a filter element according to the present disclosure is first discussed. Referring to FIG. 1a, FIG. 1b and FIG. 1c, a cross-section of respectively a first, a second and a third embodiment of a filter medium pack 10 is schematically shown. The filter medium pack 10 is extending along a longitudinal axis Z from a first end z1 to a second end z2 and comprises an axial inlet side 7 at the first end z1 of the filter medium pack for receiving the unfiltered fluid, for example a gas such as air. A circumferential side 6 forms a radial boundary of the filter medium pack 10. Fluid entering the axial inlet side 7, crosses the filter medium 5 and finally exits the filter medium pack is schematically illustrated with black arrows on FIGS. 1a to 1c.

Filter elements according to the present disclosure may use different kinds of filter medium packs, including filter medium packs comprising pleated filter media and filter medium packs comprising fluted filter media. A variety of these filter medium packs are commercially available and are known to the skilled person.

The flow direction of the fluid crossing the filter medium pack 10 can vary depending on the specific type of filter medium pack used. For example, for the first and third embodiment of the filter medium pack 10 shown on FIG. 1a and FIG. 1c, respectively, the fluid is crossing the filter medium 5 in a direction essentially parallel with the longitudinal axis Z and the filtered fluid is exiting the filter medium pack at an axial outlet side 8 at the second end z2 of the filter medium pack. On the other hand, in the second embodiment of a filter medium pack 10 as shown on FIG. 1b, the fluid is crossing the filter medium in a direction transverse to the longitudinal axis Z. In this second embodiment, the filter medium 5 has the shape of for example a hollow cylinder with a central axis coinciding with the longitudinal axis Z. In this example shown on FIG. 1b, the axial inlet side 7 of the filter medium pack comprises a ring-shaped flange 13 having an axial opening for supplying the unfiltered fluid to the filter medium 5 and the axial side 8 of the filter medium pack at the second end z2 is covered with a closed flange 14. In the second embodiment shown in FIG. 1b, the filter medium can for example be a pleated medium. For each of the examples shown at FIGS. 1A-1C, flow can also be the reverse of that shown.

In embodiments wherein the filter medium pack 10 comprises a fluted filter medium 5, the fluted filter medium 5 comprises for example coiled layers of fluted filter material. Those layers are axially coiled with respect to the longitudinal axis Z. In these embodiments, an outer surface of an outer layer of the coiled fluted filter medium is forming the circumferential side 6 of the filter medium pack 10. Such a coiled fluted filter medium is for example disclosed in U.S. Pat. No. 5,820,646. In other embodiments, as illustrated on FIG. 1c, to improve the necessary dimensional stability, the filter medium pack 10 comprises a supporting shell 9, for example made of a rigid plastic, surrounding the filter medium 5 or surrounding part of the filter medium 5. In these embodiments, an outer surface of the supporting shell 9 is forming the circumferential side 6 of the filter medium pack 10.

The present disclosure is not limited to any specific shape of the filter medium pack. For example, the cross section between the circumferential side 6 of the filter medium pack 10 and a plane perpendicular to the longitudinal axis Z, for instance can have a shape of a circle, an oval, obround, an ellipse or a rounded square.

The filter medium packs 10 are generally dimensioned in accordance with the housing they have to fit with. The filter medium pack/filter element can be inserted in the housing through a service opening of the housing. The insertion of exemplary filter elements 100 into a housing 50 so as to enclose or partly enclose the circumferential side 6 of the filter medium pack 10 with an outer sidewall 51 of the housing 50 is schematically illustrated on FIGS. 4a to 4f, FIGS. 5a to 5e and FIGS. 6a to 6e.

Filter Element with Bridge Seal Arrangement, General Characterization

In general terms, the filter element 100 according to the disclosure comprises a filter medium pack 10 as discussed above and a bridge seal arrangement 20 for bridging a gap between the radial boundary of the filter medium pack and the outer sidewall of the housing.

When for example an air filter element is being used and inserted in a housing 50, the bridge seal arrangement 20 provides for a separation between the filtered air and the ambient air surrounding the housing 50. Hence, the filtered air does not get polluted with ambient unfiltered air.

Various embodiments of a bridge seal arrangement 20 according to an aspect of the disclosure exist and a number of examples are schematically shown on FIGS. 2a to 2f and FIGS. 3a to 3e. Such a bridge seal arrangement 20 of the filter element 100 is characterized in that it has a first collar-shaped portion 20a comprising a first circumferential sealing surface 41 sealingly coupled to the circumferential side 6 of the filter medium pack 10 or sealingly coupled to a border of the axial inlet side 7. The bridge seal arrangement 20 has a second collar-shaped portion 20b that is coupled with the first collar-shaped portion 20a, and the second collar-shaped portion 20b comprises a second circumferential sealing surface 42 configured for encircling and sealingly cooperating with the outer sidewall 51 of the housing.

In embodiments, illustrated on FIG. 2a to FIG. 2f, the first collar-shaped portion 20a and the second collar-shaped portion 20b form a coupled body that can, for example, be made out of a single material, as illustrated on the these Figures with a black colour. This coupled body can for example be made out of an elastomer, such as synthetic rubber or natural rubber.

In other embodiments, the bridge seal arrangement 20 is composed out of various materials by combining parts made of, for example, an elastomer and other parts made of, for example, a rigid plastic or another rigid material. Examples of embodiments of bridge seal arrangements 20 being composed of multiple parts made of various materials are illustrated on FIGS. 3a to 3e where the parts coloured in black are made out, of for example, an elastomer and the hatched parts are, for example, made out of a hard plastic or any other relatively more rigid material.

Figure 6C:
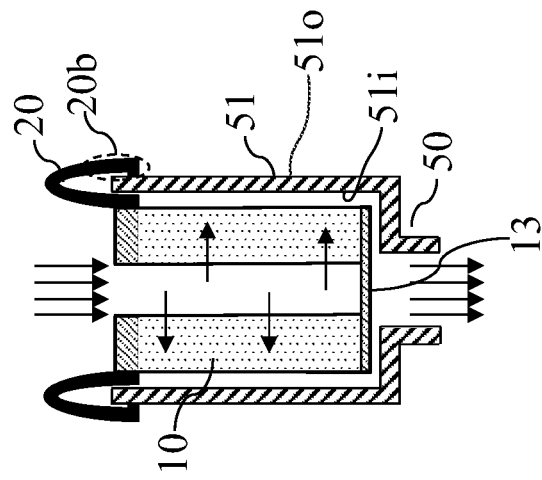
Figure 6B:
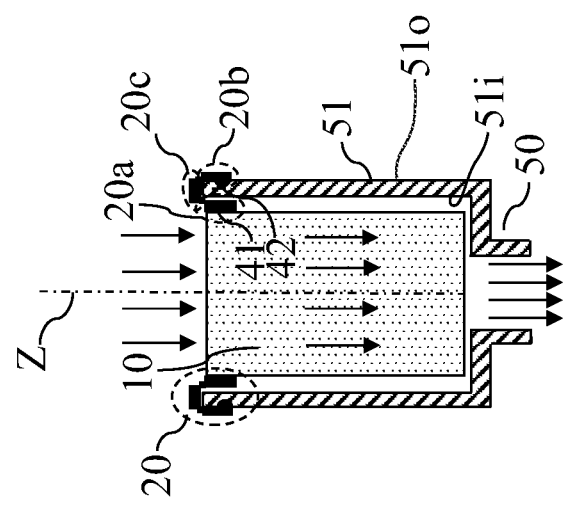
Figure 6A:
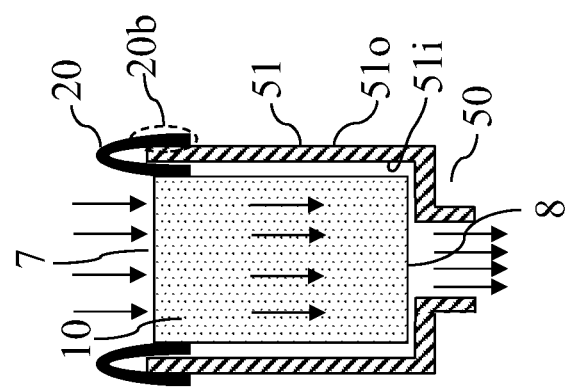
Figure 6E:
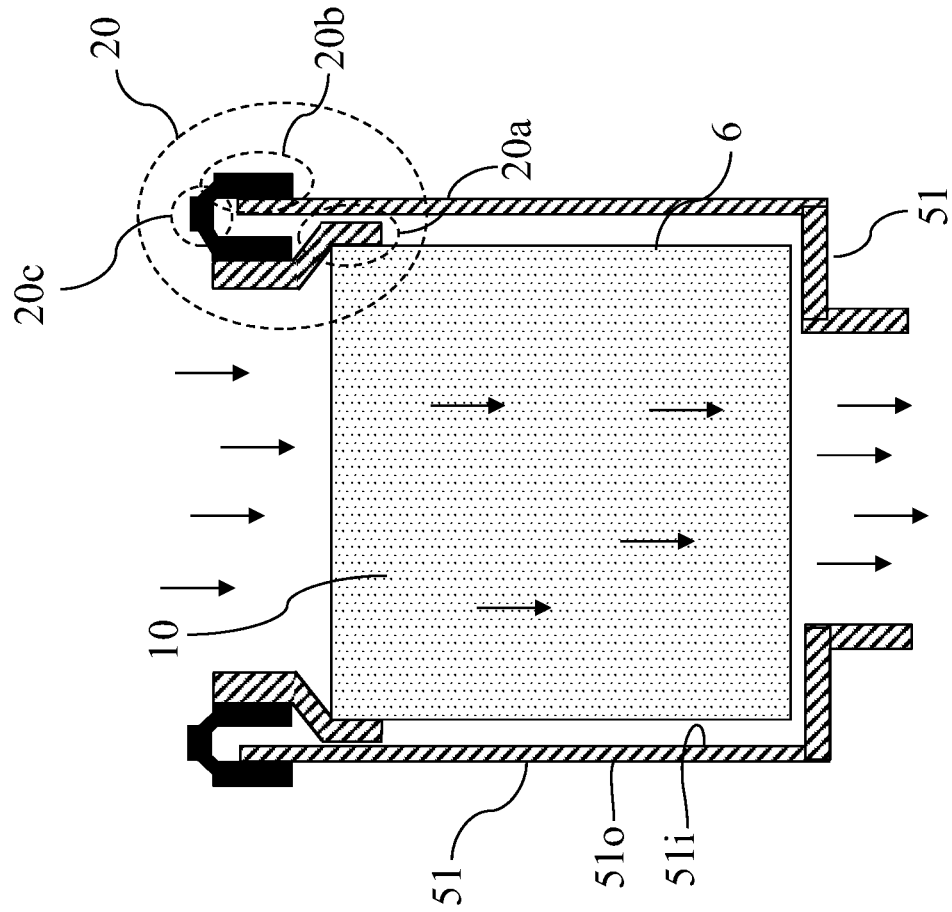

In embodiments, as illustrated for example on FIG. 6b and FIG. 6e, the bridge seal arrangement 20 comprises a collar-shaped bridging portion 20c coupling the second collar-shaped portion 20b with the first collar-shaped portion 20a. This bridging portion 20c allows, when the air filter element 100 is inserted in a housing 51, to define and maintain a spacing between the outer side 6 of the filter medium pack 10 and an outer wall of the housing. In this way, the filter medium pack 10 maintains a degree of movement within the housing allowing to absorb vibrations.

The bridge seal arrangement 20 is not limited to a particular number of collar-shaped portions that are coupled together, for example in alternative embodiments, besides the first collar-shaped portion 20a, the second collar-shaped portion 20b and the collar-shaped bridging portion 20c, the bride seal arrangement 20 comprises additional collar-shaped portions.

Coupling of the Bridge Seal Arrangement with the Filter Medium Pack

As mentioned above, the first collar-shaped portion 20a of the bridge seal arrangement 20 forms a sealed coupling with the filter medium pack 10, either with the circumferential side 6 of the filter medium pack 10 or either with a border of the axial inlet side 7 of the filter medium pack 10. Both type of coupling arrangements will be discussed.

For coupling the first circumferential sealing surface of the first collar-shaped portion 20a to the circumferential side 6 of the filter medium pack 10 a glue or any other adhesive means can be used, thereby providing a permanent and sealed connection. Alternatively, or in combination therewith, if the first collar-shaped portion 20a is made of an elastic material, such as an elastomer, the inner diameter of the first collar-shaped portion 20a can be configured such that the first collar-shaped portion 20a is stretched when positioning around the circumferential side 6 of the filter medium pack. As a result, a radial opposing force is pressing the first circumferential sealing surface against the circumferential side 6 of the filter medium pack 10. Additionally, or in the alternative, or in combination therewith, a fixation strap can be provided around the first collar-shaped portion 20a for firmly pressing the first circumferential sealing surface against the circumferential side 6 of the filter medium pack 10.

In FIG. 4a to FIG. 4d and FIG. 5a to FIG. 5c, examples are shown of bridge seal arrangements 20 wherein the first circumferential sealing surface of the first collar-shaped portion 20a is sealingly coupled to the circumferential side 6 of the filter medium pack 10. These are examples where the first and second collar-shaped portions of the bridge seal arrangement forma coupled body made from a single material, as discussed above.

Figure 5A:
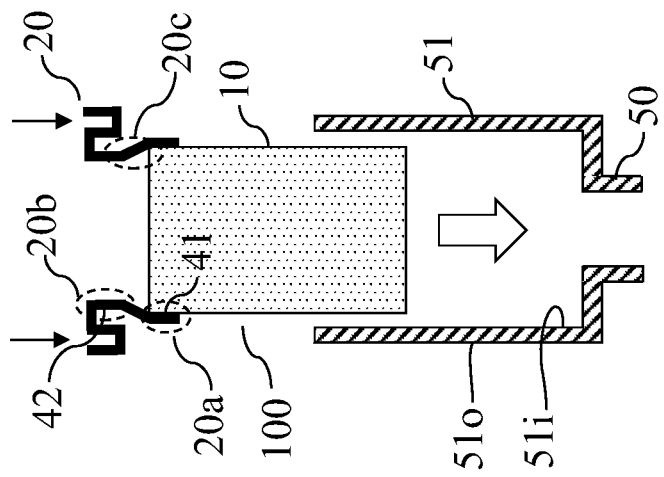
Figure 5B:
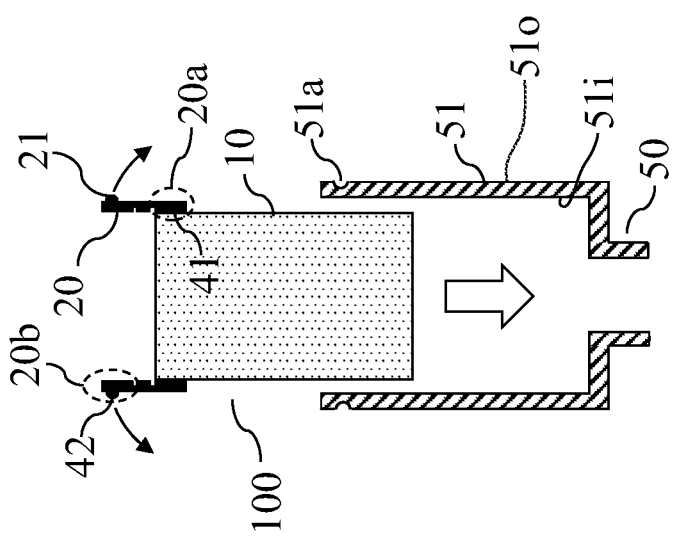
Figure 5C:
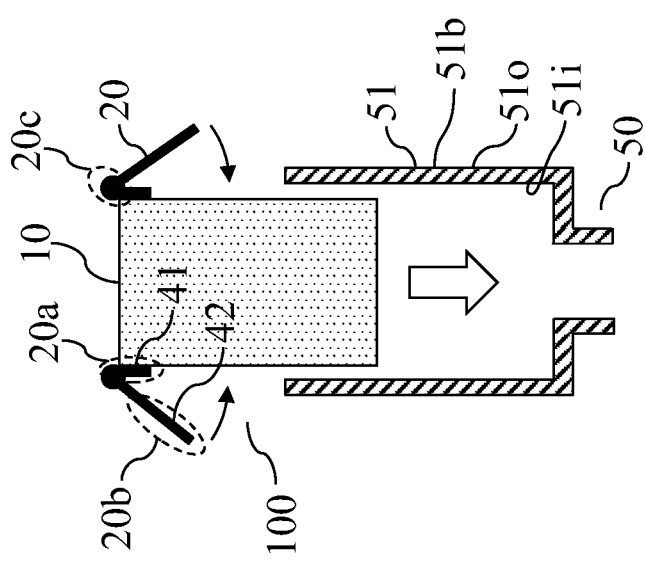

Bridge seal arrangements 20 composed of different parts of different materials, and wherein the first collar-shaped portion is for example made of a rigid material, can also be coupled to the circumferential side 6 of the filter medium pack. The bridge seal arrangement 20 of FIG. 3d is shown in combination with a filter medium pack 10 in FIG. 5d and FIG. 6e, illustrating that the first circumferential sealing surface 41 is coupled to the circumferential side of the filter medium pack 10. In these embodiments, the coupling can also be made with a glue or any other adhesive or fixation means. The bridge seal arrangement 20 shown on FIG. 3d and FIG. 6e is a particular bridge seal arrangement that reduces the fluid inflow stream.

The first collar-shaped portion 20a of the bridge seal arrangement 20 according to the present disclosure can be coupled with the circumferential side 6 of any of the exemplary filter medium packs 10 discussed above and illustrated on FIG. 1a to FIG. 1c.

If a filter medium pack 10 as discussed above and shown on FIG. 1a or FIG. 1b is used, the coupling of the first collar-shaped portion 20a to the circumferential side 6 of the filter medium pack can be made at any longitudinal position with respect to the longitudinal axis Z, i.e. at any longitudinal position between the first end z1 and the second end z2. In FIG. 4b, an example is shown where the coupling is made about half-way between the first and second end. In this way, the housing is advantageously being reduced in size.

Figure 4F:
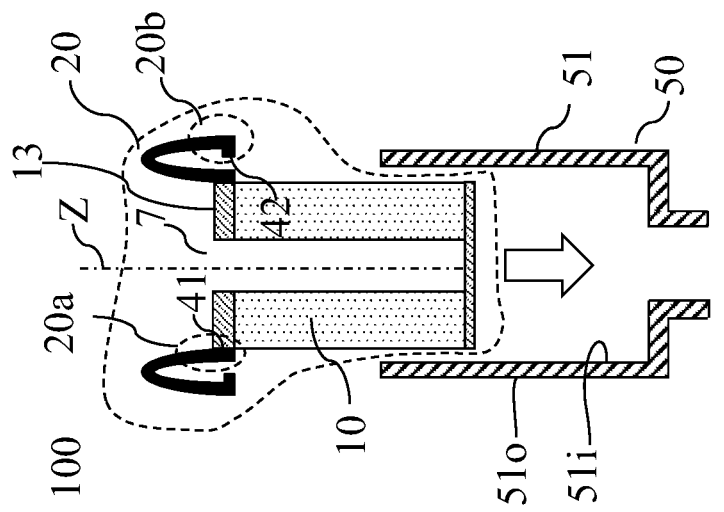

An example of a first collar-shaped portion 20a coupled to the filter medium pack 10 of the type shown on FIG. 1b, is illustrated on FIG. 4f. In this example, the first circumferential sealing surface 41 of the first-collar shaped portion 20a is sealingly coupled to a radial side of the ring-shaped flange 13 at the inlet side 7. This coupling can also be made with a glue or any other fixation means.

As mentioned above, in embodiments of a filter element 100 according to the present disclosure, the first circumferential sealing surface 41 of the first-collar shaped portion 20a can also be coupled to a border of the axial inlet side 7. A border of the axial inlet side should be construed in the broadest possible sense. The border is, for example, a peripheral radial edge area of the axial inlet side 7 or in another example the border is a circumferential surface portion of the axial inlet side 7. Two examples of coupling the first collar-shaped portion to a border of the axial inlet side 7 are further discussed.

Figure 5E:
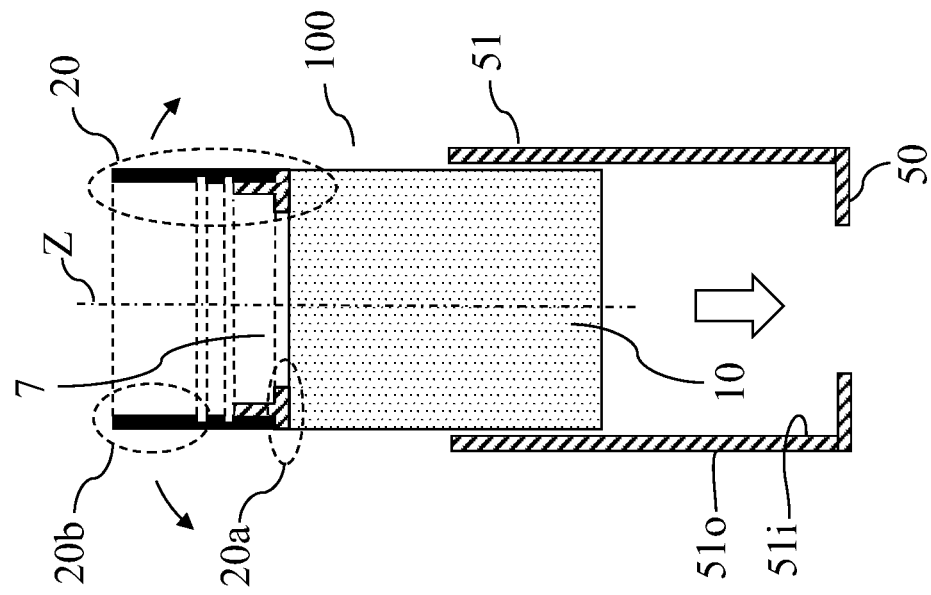
Figure 5D:
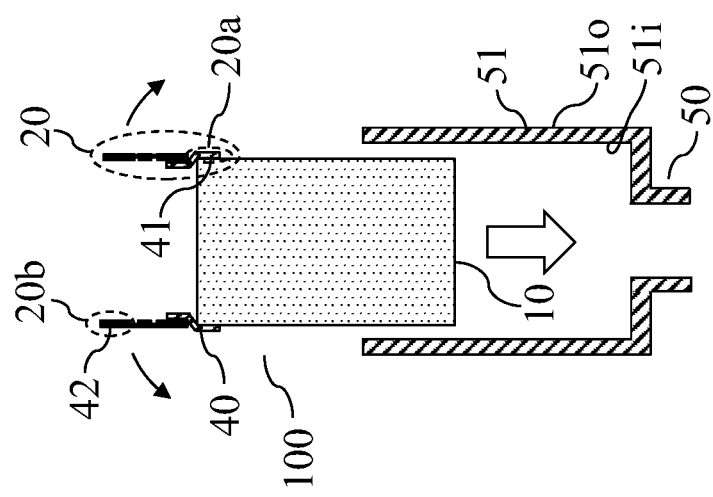

In FIG. 5e, a filter element 100 is shown comprising the bridge seal arrangement of FIG. 3e. In this embodiment, the first-collar shaped portion 20a is part of the hatched circumferential element 40 shown on FIG. 3e. This circumferential element 40 is for example made of a rigid material and the first circumferential sealing surface 41 of the first-collar shaped portion 20a can be glued to the border of the inlet side 7. When using such a bridge seal arrangement in combination with a filter medium pack 10 shown on FIG. 1a or FIG. 1c, the consequence, as can be observed from FIG. 5e, is that the inlet flow surface is reduced.

Figure 4E:
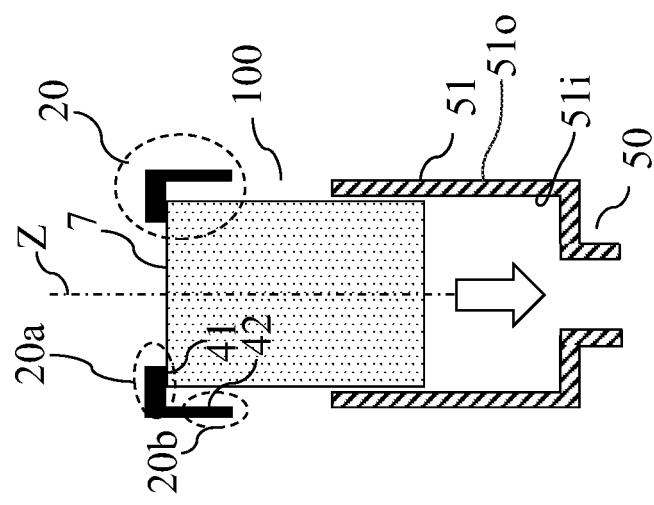
Figure 4D:
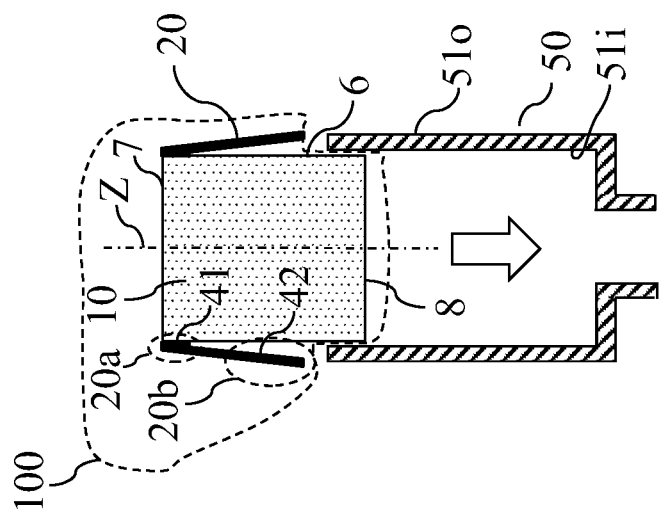
Figure 6D:
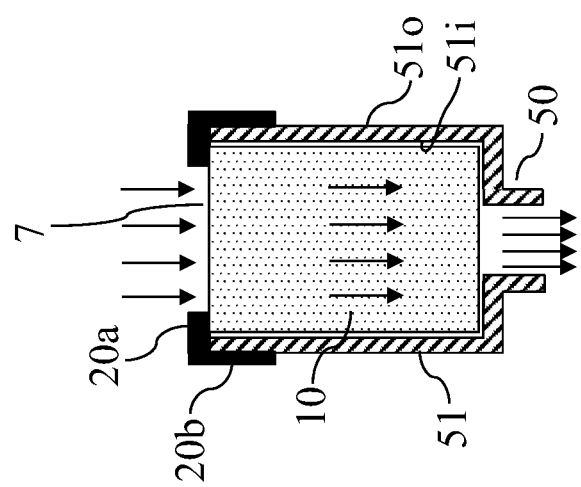

In FIG. 4e and FIG. 6d, a further example is shown of a filter element wherein the first-collar shaped portion 20a is coupled to a border of the inlet side 7. In this example, the bridge seal arrangement 20 is made of a single material, e.g. an elastomer. In this embodiment, the first circumferential sealing surface 41 of the first-collar shaped portion 20a is coupled, for example with a glue, to a circumferential surface portion of the axial inlet side 7 forming the border of the axial inlet side 7.

Bridge Seal Arrangements, Sealed and Un-Sealed Positions

In embodiments according to the present disclosure, the bridge seal arrangement 20 can be configured for moving the second collar-shaped portion 20b with respect to the first collar-shaped portion 20a from a first position to a second position and vice-versa. As mentioned above, the first and second positions are also named un-sealed position and sealed position, respectively. For example, to insert or remove the filter element from the housing, the second collar-shaped portion 20b is to be moved between a sealed and un-sealed position.

In some embodiments, when moving the second collar-shaped portion 20b from an un-sealed to a sealed position, the second-collar shaped portion 20b is substantially stretched while in other embodiments the second collar-shaped portion 20b is not substantially stretched but for example only bent/flexed or folded when in the sealed position. Whether the second-collar shaped portion 20b is substantially stretched or not will depend on the detailed design of the bridge seal arrangement and on the material the second-collar shaped portion is made of.

Preferably, the bridge seal arrangement 20 is configured such that, when moving from the un-sealed to the sealed position, the second collar-shaped portion is stretched and/or flexed such that the second collar-shaped portion is elastically deformed when in the sealed position. In other words, in order to position the second collar-shaped portion 20b around the outer sidewall 51 of the housing 50 such that the second circumferential sealing surface 42 is encircling and sealingly cooperating with the outside surfaces 51o of the outer sidewall 51, the second collar-shaped portion is to be stretched and/or flexed in order to firmly fit around the outer sidewall 51.

Advantageously, for embodiments where the second collar-shaped portion is made of an elastomer, the second collar-shaped portion is, due to the stretching and/or flexing, predominantly elastically deformed when in the sealed position. In this way, as a result of the forces applied for stretching and deforming the seal, a radial opposing force is pressing automatically/intrinsically the second circumferential sealing surface against the outer sidewall of the housing. Advantageously, by using a stretchable seal, a secure sealing is obtained and there is no need for adding an additional fixation member, such as for example a fixation clamp around the second collar-shaped portion 20b.

Figure 7C:
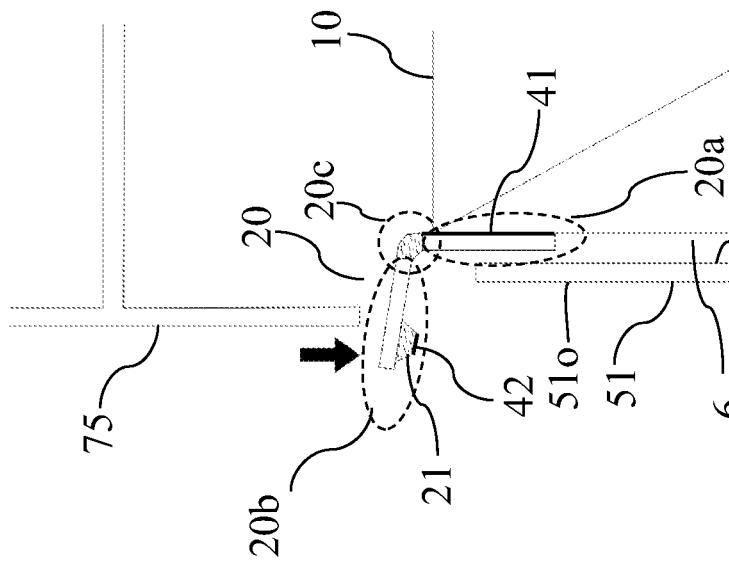
Figure 7B:
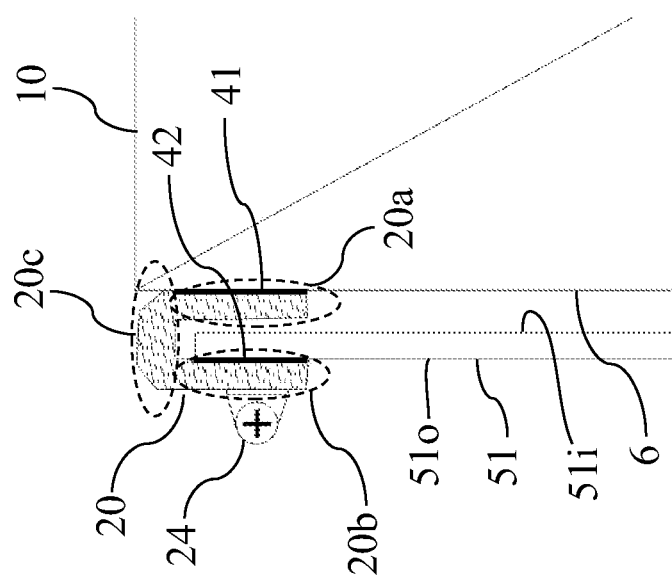
Figure 7A:
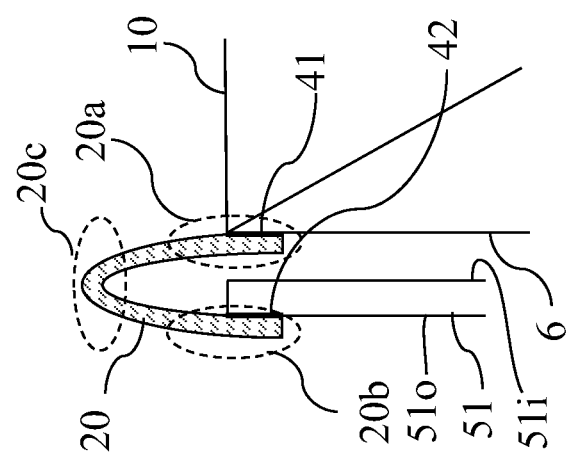

In other embodiments, to increase the radial force pressing the second circumferential sealing surface against the outer sidewall of the housing and/or to maintain the second collar-shaped portion in place, a fixation clamp 24 as shown on FIG. 7b can be optionally added.

Whether a fixation means such as a fixation clamp or a fixation ring is mandatory or not also depends on the type of fluid used and the specific application the filter element is used for. Depending on the application, e.g. use of a liquid such as oil or use of a gas such as air, the pressure differences between the filtered fluid and the unfiltered fluid can be quite different. For applications where the fluid is for example an oil, e.g. for hydraulic applications, and where pressure differences can be high, an additional fixation means is preferably provided.

A number of embodiments of bridge seal arrangements are now discussed in more detail. A distinction can be made between embodiments where the second collar-shaped portion is elastic and is substantially stretched for forming a sealed coupling and embodiments were the second collar-shaped portion is, although potentially elastic, not substantially stretched, i.e. made longer or wider, but only for example bent/flexed when in the sealed position. A third category of embodiments are embodiments wherein the collar-shaped portion is non-stretchable and where fixation means are required for keeping the second collar-shaped portion in the sealed position.

a) Substantially Stretchable Seal Arrangements

Examples of bridge seal arrangements 20 that are substantially stretched when moving from an un-sealed to a sealed position are, for example, shown on FIG. 2f and FIGS. 3a to 3e. In FIG. 5b to FIG. 5d, examples of filter elements are shown wherein these type of bridge seal arrangements 20 are in an un-sealed position, and in FIG. 6b and FIG. 6c examples are shown of a sealed position.

A preferred embodiment of a bridge seal arrangement 20 according to the present disclosure is shown on FIG. 2e and is further named wide band seal. This embodiment can indeed be considered as a wide elastic and stretchable band wherein a lower portion and an upper portion forms respectively the first 20a and second 20b collar-shaped portion of the bridge seal arrangement 20. In other words, the first and second collar-shaped portion form a coupled single body that is preferably made of a stretchable single material such as an elastomer. The wide band seal does not necessarily need to have a cylindrical shape but the wide band seal can have any suitable shape adapted accordingly to the shape of the filter medium pack and/or the shape of the housing the band has to fit with. The opening through the first 20a and second 20b collar-shaped portion are also not necessarily the same. For example, the wide band seal can have the shape of a truncated cone wherein a lower base part of the cone corresponds to the first collar-shaped portion 20a configured to fit with the filter medium pack and a truncated upper part of the cone corresponds to the second collar-shaped portion 20b configured to firmly fit around the outer sidewall of the housing after folding/stretching/flexing the second collar-shaped portion.

As illustrated on FIG. 6b and FIG. 13, to form a sealed connection between the outer wall 51 of the housing and the second collar-shaped portion 20b of the wide band seal, the wide band seal is folded and stretched. In some embodiments, in order to facilitate this folding and stretching of the band, one or more folding lines 20g are provided, as shown on FIG. 2f. Indeed, as schematically illustrated on for example FIG. 2f and FIG. 3d, the second collar-shaped portion 20b comprises a first section and a second section wherein a wall thickness of the first section is smaller than a wall thickness of the second section. In this way the one or more predetermined folding lines 20g are formed in the second-collar shaped portion. Indeed, the sections where the wall thickness is reduced are predetermined in order to facilitate a folding and/or stretching of the bridge seal arrangement 20 to the right locations. In further embodiments, as illustrated for example in FIG. 11a and FIG. 11b, to further improve the folding of the bridge seal arrangement 20, the collar-shaped bridging portion 20c comprises a third section and a fourth section wherein a wall thickness of the third section is smaller than a wall thickness of the fourth section. The different wall thicknesses are configured not only to facilitate the folding of the bridge seal arrangement 20 but also to avoid that the foldable seal is folding back from the sealed to the un-sealed position.

Predetermined folding lines can be made in the second collar-shaped portion 20b and/or bridging portion 20c, as mentioned above, by reducing the wall thickness at specific predetermined locations. Alternatively, starting from a given overall wall thickness, the wall thickness can also be reinforced at predetermined locations in order to generate thickness variations and hence obtain the same effect of facilitating the folding of the bridge seal arrangement.

In the embodiments shown on FIG. 2f and FIG. 3d, the predetermined folding lines 20g are illustrated as radial lines in the elastic band 45. However, in alternative embodiments, predetermined folding lines can also be made in a longitudinal direction parallel with a central axis of the bridge seal arrangement. For example if the housing has a rounded square shape, longitudinal predetermined folding lines can be provided in the second collar-shaped portion 20b by, for example, reducing the wall thickness of the collar-shaped portion at those specific locations corresponding with the corner portions of the housing. In this way, the second collar-shaped portion will also firmly fit in the corners of the housing.

Reference is made to FIG. 11a and FIG. 11b where an example of a wide band seal is shown in more detail when in the un-sealed position and in the sealed position, respectively. In this example, the bridge seal arrangement 20 comprises a lip portion 20d coupled to the first collar-shaped portion 20a and configured for cooperating with an inner surface 51i of the outer wall 51 of the housing to additionally maintain/position the bridge seal arrangement 20 in position when folded in the sealed position.

Figure 10B:
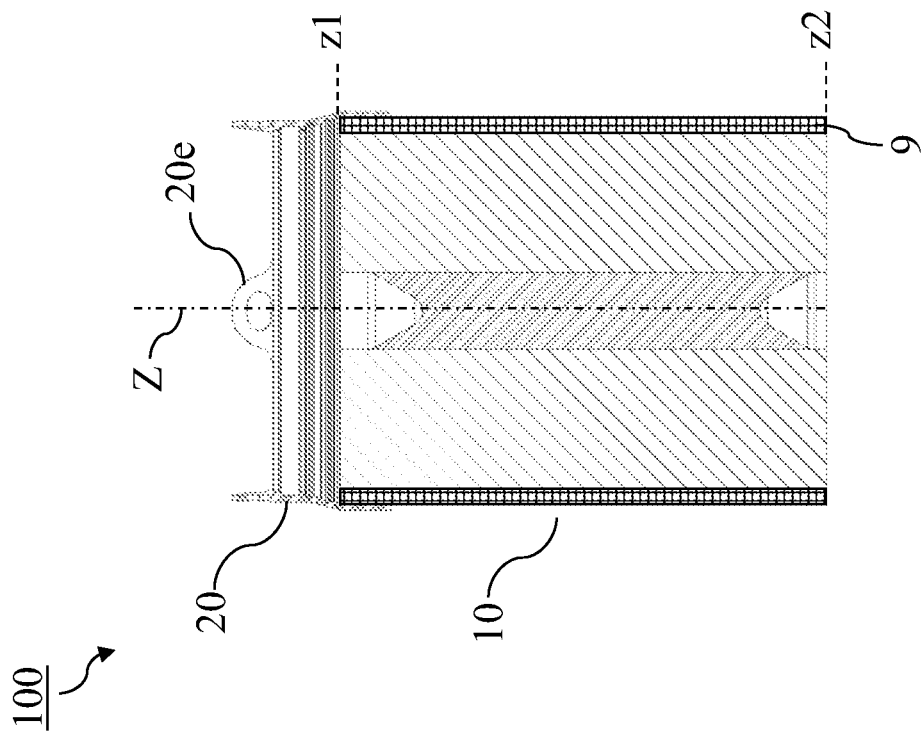
Figure 10A:
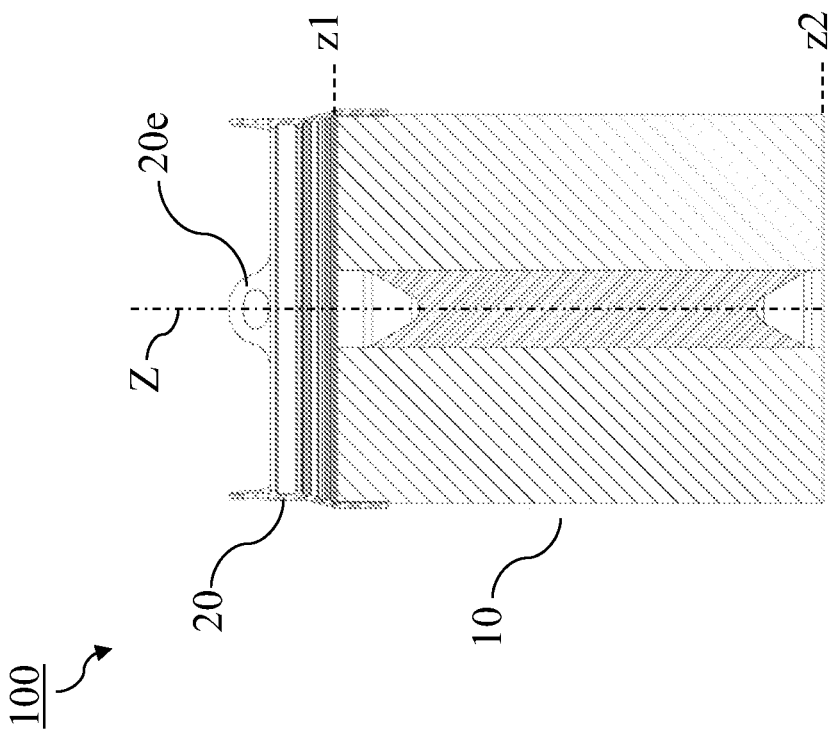

Advantageously, the wide band seal embodiment can be used in combination with any of the filter medium packs 10 discussed above and shown on FIG. 1a to FIG. 1c. FIG. 10a and FIG. 10b illustrate for example a filter element 100 wherein a wide band seal is coupled to a filter medium pack 10 corresponding to respectively FIG. 1a and FIG. 1c.

In embodiments, the second circumferential sealing surface 42 forms a radially outward-facing circumferential surface and a radially inward-facing circumferential surface when the second collar-shaped portion 20b is in respectively the un-sealed and the sealed position. In FIG. 2f, an example is shown of an un-sealed position, illustrating that the second circumferential sealing surface 42 of the second collar-shaped portion 20b is facing radially outwardly, i.e. the second circumferential sealing surface 42 is located at the outside of the second collar-shaped portion 20b when in the un-sealed position. On the other hand, in FIG. 6b, an example of a sealed position is shown, illustrating that the second circumferential sealing surface 42 of the second collar-shaped portion 20b is facing radially inwardly, i.e. the second circumferential sealing surface 42 is located at the inside of the second collar-shaped portion 20b when in the sealed position. In these embodiments, a circumference of the circumferential sealing surface 42 is increasing from a first value $C_{out}$ to a second value $C_{in}$ when moving from the un-sealed to the sealed position, with $$\frac{|C_{in} - C_{out}|}{C_{out}} \geq 1\%,$$

preferably $$\frac{|C_{in} - C_{out}|}{C_{out}} \geq 5\%,$$

more preferably $$\frac{|C_{in} - C_{out}|}{C_{out}} \geq 10\%.$$

Alternative embodiments of bridge seal arrangements 20 comprising an elastic and stretchable band 45 are shown on FIGS. 3a, 3d and 3e. In these embodiments the band 45, made out of for example an elastomer, is coupled to a further circumferential element 40 that is made out of a rigid material such as a hard plastic or a metal. In these embodiments, as illustrated on FIG. 3a, FIG. 3d and FIG. 3e, the first collar-shaped portion 20a of the bridge seal arrangement 20 corresponds to a portion of the circumferential element 40 and the second collar-shaped portion 20b corresponds to an upper portion of the elastic band 45. These type of bridge seal arrangements 20 are further illustrated on FIG. 5d, FIG. 5e and FIG. 6e, where the bridge seal arrangements are shown in combination with a filter medium pack 10 and a housing 50.

Figure 8B:
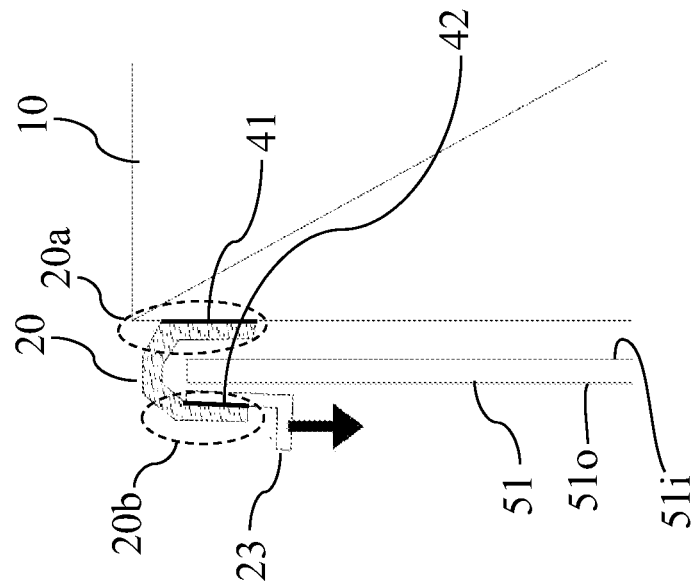
Figure 8A:
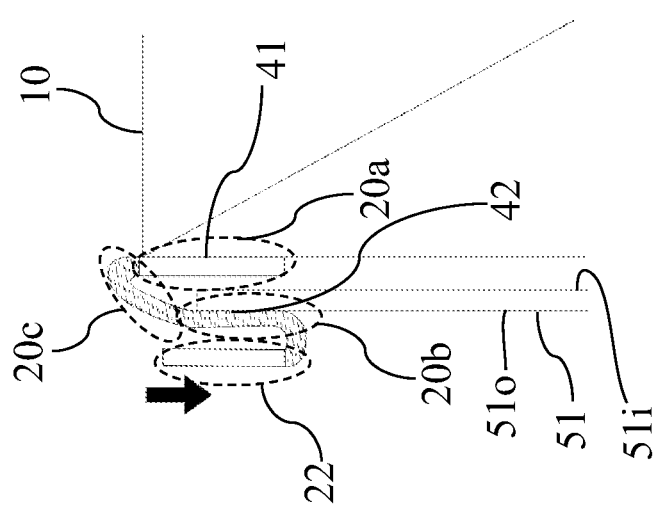

A further example of a substantially stretchable bridge seal arrangement 20 is shown on FIG. 3c and FIG. 8a wherein a flexible and stretchable band, preferably made out of an elastomer and coloured in black on FIG. 3c, is coupled to a circumferential element that is made out of a rigid material such as a hard plastic or a metal, and wherein this circumferential element is forming the first collar-shaped portion 20a of the bridge seal arrangement 20.

b) Substantially Flexible/Bendable Seal Arrangement

Filter elements comprising bridge seal arrangements 20 as for example shown on FIG. 2a to FIG. 2d, FIG. 4a to FIG. 4d and FIG. 6a and FIG. 6c, are examples where there is no major stretching necessary to bring the second collar-shaped portion 20b in the sealed position. These type of bridge seal arrangements can be brought in the sealed position by, for example, slightly bending/flexing the second collar-shaped portion outwardly when inserting the filter element in the housing. When this second collar-shaped portion 20b is made of an elastomer, the bending/flexing also results in an elastic deformation. As discussed above, an opposing radial force will press the second circumferential sealing surface against the outer sidewall of the housing. However, when compared to the wide band seal discussed above the opposing radial force can be weaker. Hence, in these embodiments, a fixation clamp can optionally be added around the second collar-shaped portion to increase the radial force and/or keep the bridge seal arrangement in place.

c) Bridge Seal Arrangements Using a Fixation Clamp

For embodiments where the second collar-shaped portion 20b is not being stretched when positioning the second collar-shaped portion 20b around the outer sidewall 51 of the housing 50, but for example only bent or folded without elastic deformation, a fixation clamp 24 or any other fixation means is needed to press and maintain the second circumferential surface 42 against the outer sidewall 51. For example, when using a bridge seal arrangement 20 as shown on FIG. 3b wherein the second collar-shaped portion 20b is mainly made of a rigid material, the second collar-shaped portion 20b can be folded or bent with respect to the first collar-shaped portion 20a due to a bridging portion 20c coupling the first and second collar-shaped portions. In this example, the second collar-shaped portion 20b comprises a sealing member 47 that is for example made out of an elastomer and that comprises the second circumferential sealing surface 42. To maintain this second circumferential sealing surface 42 pressed against the outer sidewall of the housing, a fixation means such as a clamp is used.

A further example of a bridge seal arrangement requiring a fixation clamp is shown on FIG. 2e. In this embodiment, the second collar shaped portion 20b, is made out of an elastic material such as an elastomer and needs to be moved/folded in the direction shown by the arrows in order to bring the second sealing surface 42 in contact with the outer wall of the housing. These type of embodiments require a fixation clamp to maintain the second sealing surface 42 pressed against the outer wall 51 of the housing and when releasing and removing the clamp, the second collar shaped portion 20b will automatically, due to the elastic properties of the second collar-shaped portion, move back to the unsealed position shown on FIG. 2e.

Outer Sidewall of the Housing

When using a bridge seal arrangement 20 wherein at least the second collar-shaped portion 20b is stretched and/or flexed and thereby elastically deformed when moving from the un-sealed to the sealed position, the second circumferential sealing surface 42 of the second collar-shaped portion 20b can sealingly cooperate with outer surface 51o of the sidewall 51 of various shapes. Indeed, the outer sidewall surface 51o can for example have a drop shape or any other shape that can be contoured by the second circumferential sealing surface 42 of the second collar-shaped portion 20b. Due to the opposing force resulting from the elastic deformation, the second circumferential sealing surface 42 will be firmly pressed against the outer sidewall surface 51o independently of the shape of the outer wall.

In embodiments according to the present disclosure, and as illustrated in FIG. 5b, the second collar-shaped portion 20b comprises a sealing rib 21 wherein a radial surface of the radial sealing rib 21 forms the second circumferential sealing surface 42. Advantageously, a groove 51a can be provided in the outer sidewall 51 of the housing as illustrated on FIG. 5b and be configured such that when the bridge seal arrangement is in the sealed-position, the sealing rib 21 engages with the groove 51a for forming a firm sealing, illustrated on FIG. 6b. In particular embodiments, the outer sidewall 51 of the housing comprises as an alternative, or in addition to the groove 51a, further anchoring means. For example, instead of a continuous radial groove, one or more discrete indentations can be made onto the outer sidewall 51 and the second circumferential sealing surface 42 is then adapted accordingly with for example corresponding discrete bulbous portions that sealingly fit with the indentations.

Figure 9B:
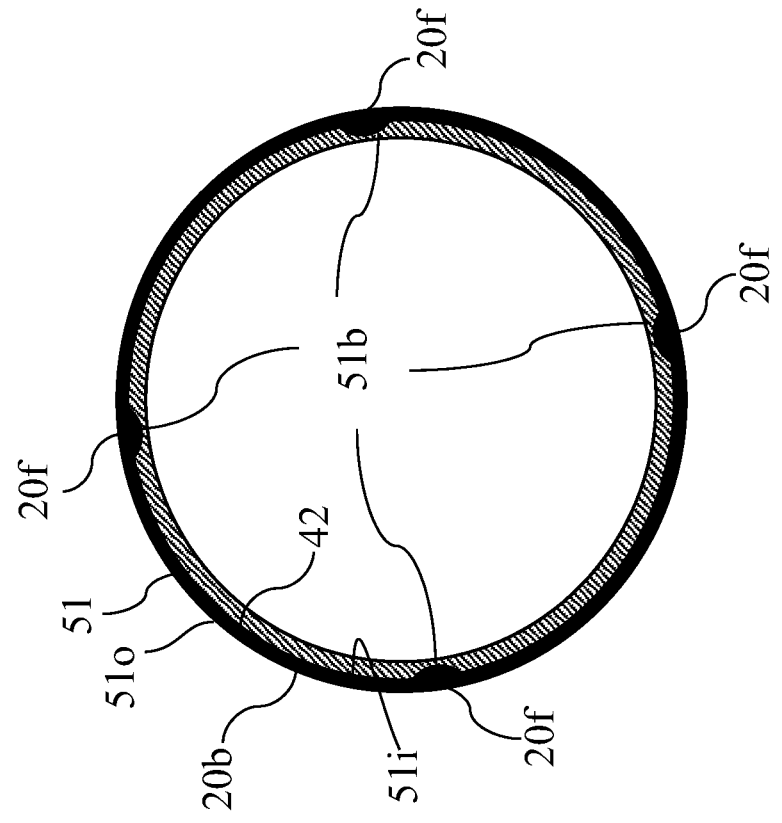
Figure 9A:
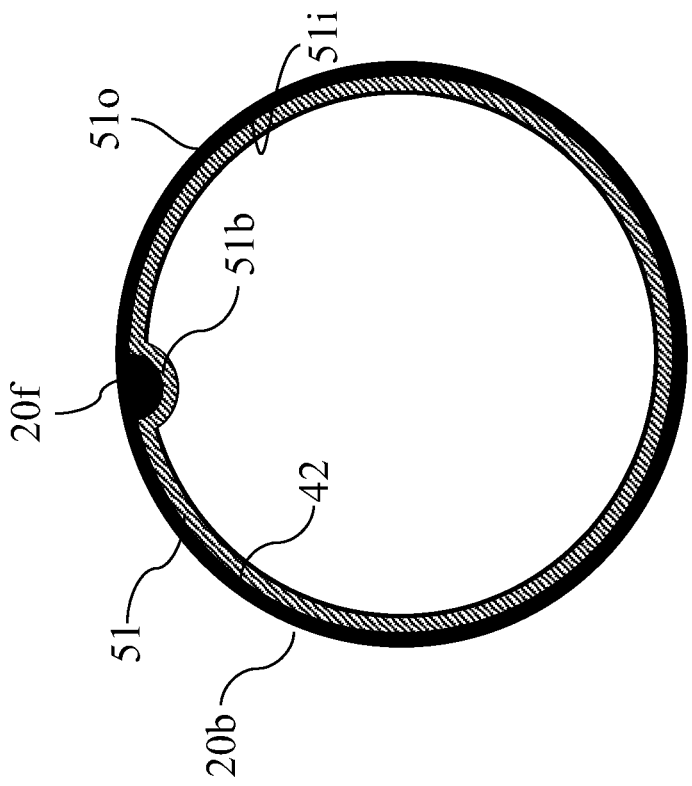

In an embodiment, illustrated on FIG. 9a, the second collar-shaped portion 20b comprises an inwardly protruding portion 20f configured for fitting and/or cooperating with an indentation portion 51b of the outer sidewall 51. As shown on FIG. 9a, this indentation portion 51b is for example a portion that is forming a convex surface portion at the inside surface 51i of the outer sidewall 51 and forming a concave surface portion on the outside surface 51o of the outer sidewall 51. The convex portion can also be construed as an inwardly directed portion. In this way, a specific orientation can be defined for the filter element 100 with respect to the housing. In some embodiments as shown on FIG. 9b, the second collar-shaped portion 20b comprises multiple inwardly protruding portions 20f and the outer wall 51 comprises corresponding multiple indentation portions 51b. In this example shown on FIG. 9b, four indentation portions 51b and four corresponding inwardly protruding portions 20f are schematically illustrated.

In embodiments, the second collar-shaped portion of the bridge seal arrangement can have a different radial stretchability along its perimeter.

In embodiments comprising a stretchable bridge seal arrangement 20, as discussed above, the second collar-shaped portion 20b comprises an engaging section 20h configured for engaging with a matching section of the outer sidewall 51 of the housing. In this way, the second collar-shaped portion 20b of the bridge seal 20 is hold in place when being in the sealed position. A further advantage of such a bridge seal configuration is that when moving the second collar-shaped portion 20b from the un-sealed to the sealed position, the positioning of the second collar-shaped portion around the outer sidewall 51 of the housing is facilitated. Examples of such embodiments are shown in FIG. 19a and FIG. 19b wherein the circles indicate the area where the engaging section 20h of the seal 20 is engaging with a corresponding matching section of the outer sidewall 51 of the housing.

In the embodiment shown in FIG. 19a, the matching section of the outer sidewall 51 is formed by a circumferential rim 51c and the engaging section 20h of the seal has a circumferential indentation configured such that when the seal 20 is in the sealed position, as shown in FIG. 19a, the indentation 20h is engaging with the rim 51c of the outer sidewall 51 of the housing, so as to hold the seal 20 in the sealed position.

In the embodiment shown in FIG. 19b, the matching section of the outer sidewall 51 is formed by a circumferential groove 51d and the engaging section 20h of the seal has a circumferential lip 20j configured such that when the seal 20 is in the sealed position, as shown in FIG. 19b, the lip 20j is engaging with the groove 51d of the outer sidewall 51 of the housing, so as to hold the seal 20 in the sealed position. In the embodiment shown on FIG. 19b, the seal 20 comprises a further lip 20i configured for cooperating with a wall portion of for example a cover of the housing or a pre-cleaner 75.

Installation Tools and Auxiliary Equipment

As already discussed above and as shown on FIG. 7b a fixation clamp 24 can be positioned around the second collar-shaped portion 20b of any of the bridge seal arrangements 20 according to the present disclosure. Such fixation clamp 24 is configured for pressing the second circumferential sealing surface 42 against the outer sidewall 51 of the housing. In this way, a secure sealing can be established and air leakage can be avoided, especially for situations where the air filter element 100 is exposed to heavy vibrations.

In some embodiments, installation tools are provided for switching a foldable bridge seal arrangement between an unsealed and a sealed position. For example, FIG. 8a presents an embodiment wherein the bridge seal arrangement 20 comprises a rigid guiding element 22 attached to the second collar-shaped portion 20b. This rigid guiding element 22 allows for facilitating the folding and unfolding of the bridge seal arrangement by performing a translation motion of the rigid element 22, for example along an axis parallel with the longitudinal axis Z of the filter element as indicated by the black arrow on FIG. 8a. In a further example, shown on FIG. 8b, a removable installation tool 23 is provided between the first and second collar-shaped portions of the bridge seal arrangement 20 in order to increase a distance between the first and second collar-shaped portions and generate for example an elastic deformation to the second collar-shaped portion 20b. In this embodiment, the bridge seal arrangement 20 is configured such that after removing the installation tool 23 by moving the installation tool in a direction that is for example parallel with the longitudinal axis as shown with the black arrow on FIG. 8b, a radial opposing force is pressing the second circumferential sealing surface 42 against the outer sidewall 51 of the housing.

FIGS. 10a and 10b present a cross sectional view of an example of a filter element 100 comprising an air filter pack 10 and a foldable/stretchable bridge seal arrangement 20 positioned in an un-sealed position. In this example, the bridge seal arrangement 20 comprises one or more handles 20e coupled to the second collar-shaped portion 20b. These handles allow to help to fold the bridge seal arrangement from the unsealed position to the sealed position. As will be discussed below, when in the sealed position, the handles can also be attached to protruding elements 56 of the housing as further illustrated on FIG. 12 and FIG. 13.

FIG. 7c illustrates part of an embodiment of an air filter element comprising a bridge seal arrangement 20 for use with a pre-cleaner 75 or a cover. The pre-cleaner 75 or cover is configured for pushing the second collar-shaped portion 20b of the bridge seal arrangement 20 from an unsealed position to a sealed position. As illustrated by the black arrow on FIG. 7c, by translating the pre-cleaner 75 or the cover along an axis parallel with the longitudinal axis of the air filter element, the second collar-shaped portion 20b will be folded with respect to the first collar-shaped portion until the second circumferential sealing surface 42 is making contact with the outer sidewall 51 of the housing.

Filtering Element Kit

The filtering elements 100 according to the present disclosure, as discussed above, have two major parts, namely the filter medium pack 10 and the bridge seal arrangement 20.

The filter element 100 can either be construed as a single unit or as a kit of parts comprising at least a first part being the filter medium pack 10 and a second part being the bridge seal arrangement 20.

For example, the filter element can be provided as a unit manufactured in a factory where the first circumferential sealing surface 41 of the first collar-shaped portion 20a is sealingly coupled to the circumferential side 6 of the filter medium pack 10 or sealingly coupled to a border of the axial inlet side 7 in the factory as part of the manufacturing process of the filtering element 100.

Alternatively, a filter element kit can be provided comprising a filter medium pack 10 and a bridge seal arrangement 20, wherein the end-user can sealingly couple the first circumferential sealing surface 41 to the circumferential side 6 of the filter medium pack 10, or to a border of the axial inlet side 7, for example at the moment of installation of the filter element 100 in the housing 50.

Filter Systems

The present disclosure also pertains to a filter system comprising a filter element 100 as discussed above. A perspective view and a cross-sectional view of an exemplary embodiment of a filter system 200 is illustrated in respectively FIG. 12 and FIG. 14b. The filter system is for example an air filter system comprising an air filter element.

Such a filter system 200 according to the present disclosure comprises a housing 50 having an outer sidewall 51 enclosing or partly enclosing the circumferential side of the filter medium pack 10 of the filter element 100. As shown on FIG. 15b, the second circumferential sealing surface of the second collar-shaped portion 20b is encircling and sealingly cooperating with the outer sidewall 51 of the housing.

The housing 50 of the filter system 100 comprises a receptacle chamber for receiving the air filter element 100 and a service opening in the housing allows to insert or replace a filter element 100 from the housing. In the embodiments shown on FIG. 12 to FIG. 17, the housing has a cylindrical shape and the service opening is an axial opening in the housing. In other embodiments the housing can have a different shape adapted to for example the shape of the filter medium pack.

FIG. 12 presents a perspective view of an embodiment of a filter system 200 according to the disclosure wherein a filter element 100 is inserted in a housing 50 and wherein the filter element comprises a foldable/stretchable bridge seal arrangement 20 as discussed above. In FIG. 12, the bridge seal arrangement 20 is in an unsealed position whereas in FIG. 13 the bridge seal arrangement 20 is folded/stretched into a sealed position. FIG. 14a and FIG. 15b correspond to a top view of the air filter system shown on FIG. 12 and FIG. 13, respectively. FIGS. 14b and 15b correspond to cross sectional views taken with respect to a plane A shown on FIGS. 14a and 15a, respectively.

In embodiments of an air filter system 200 according to the present disclosure, a pre-cleaner 75 is provided for pre-cleaning the unfiltered air before entering the filter medium pack 10. Pre-cleaners for pre-cleaning the air before entering the filter medium pack are known in the art. As illustrated on FIG. 16a and FIG. 16b, the pre-cleaner 75 is removably coupled to the housing 50. In these embodiments, the second collar-shaped portion 20b comprises a third circumferential sealing surface 43 configured for cooperating with an inner surface of the pre-cleaner 75. Typically the third circumferential sealing surface 43 and the second circumferential sealing surface 42 are opposing surfaces. Advantageously, with the bridge seal arrangement 20 according to the present disclosure, no additional seal is needed for sealing the coupling between the pre-cleaner and the housing of the air filter system.

In embodiments of a filter system 200, one or more protruding elements 56 are attached to the outer sidewall 51 of the housing, as shown on FIG. 12. As further illustrated on FIG. 13, when the bridge seal arrangement 20 comprises one or more handles 20e as discussed above, these one or more handles 20e can be coupled to corresponding protruding elements 56 for keeping the bridge seal arrangement 20 in place.

FIG. 17 shows an air filter system 200 comprising one or more latches 80 for latching a pre-cleaner 75 or for latching a filter cover to the housing 50. Advantageously, the one or more latches 80 is coupled with a corresponding handle of the one or more handles 20e of the bridge seal arrangement 20.

In embodiments, the filter system 200 comprises a filter cover to for example protect at least part of the axial inlet side of the filter medium pack and wherein the filter cover comprises a circumferential cover portion that is positioned around the second collar-shaped portion 20b and configured for pressing the second circumferential sealing surface 42 against the outer sidewall 51 of the housing.

Method of Servicing a Filter System

The present disclosure also pertains to a method of servicing a filter system for filtering a fluid comprising a housing 50 having a service opening. The filter system is for example an air filter system for filtering air. The method comprising steps of
  providing a filter element 100 comprising a filter medium pack 10 including a filter medium 5 such as a fluted medium or a pleated medium or any other medium suitable for filtering the fluid,
  providing a bridge seal arrangement 20 comprising
  a) a first collar-shaped portion 20a having a first circumferential sealing surface suitable for sealingly coupling to a circumferential side 6 of the filter medium pack 10 or suitable for sealingly coupling to a border of an axial inlet side of the filter medium pack 10, and
  b) a second collar-shaped portion 20b coupled to the first collar-shaped portion 20a, and having a second circumferential sealing surface suitable for encircling an outer sidewall 51 of the housing 50,
  sealingly coupling the first circumferential sealing surface to the circumferential side 6 of the filter medium pack 10, or sealingly coupling the first circumferential sealing surface to a border of the axial inlet side of the filter medium pack 10,
  inserting the filter element 100 in the housing 50 through the service opening,
  positioning the filter element 100 and/or the second collar-shaped portion 20b such that the second circumferential sealing surface is encircling and is sealingly cooperating with the outer sidewall 51 of the housing 50.

Bridge Seal Arrangements for Inner Wall Coupling

The embodiments of filter elements 100 for filtering a fluid according to the present disclosure as discussed above are embodiments wherein the bridge seal arrangement 20 has a second circumferential surface 42 configured for encircling and sealingly cooperating with the outer sidewall 51 of the housing of a filter system. An alternative filter element 100 wherein the bridge seal arrangement 20 has a circumferential surface configured for encircling and sealingly cooperating with a surface of a tube-shaped wall portion that is located inside the housing of a filter system, is further discussed below. This wall portion is not necessarily a cylindrical tube-shaped portion but it can have any shape including irregular shapes such as a drop shape.

Examples of these alternative embodiments of filter elements 100 for filtering a fluid are illustrated on FIG. 18a to FIG. 18d where a filter element 100 is shown that is inserted in a housing 50 of a filter system. The fluid can be a liquid or a gas, such as for example air.

The embodiment of a filter element for filtering a fluid as illustrated on FIG. 18a to FIG. 18d comprises a filter medium pack 10 extending along a longitudinal axis Z and having a first 7 and a second 8 axial side forming an axial boundary of the filter medium pack, and a circumferential side 6 is forming a radial boundary of the filter medium pack. The filter element 100 comprises a bridge seal arrangement 20 having a first ring-shaped or collar-shaped portion 20a comprising a first circumferential sealing surface sealingly coupled to the circumferential side 6 or sealingly coupled to a border of the second axial side 8, and a second collar-shaped portion 20b coupled with the first collar-shaped portion 20a, and wherein the second collar-shaped portion 20b comprises a second circumferential sealing surface configured for encircling and sealingly cooperating with an outer surface 55o of a tube-shaped wall portion 55 that is located inside the housing 50 of a filter system 200.

In embodiments, as shown on FIG. 18a to FIG. 18d, the seal 20 comprises a liner element 26 coupled to the collar-shaped portion 20b. This liner element 26 facilitates the insertion of the filter element in the housing and to maintain the seal in a firm sealing contact. The thick black arrows indicate a direction for pushing the liner element 26 such that the seal is well positioned in a sealed position.

The embodiments of filter elements shown on FIG. 18c and FIG. 18d comprise a filter medium pack 10 as shown on FIG. 1a, i.e., unfiltered fluid is received at the first axial side 7 and filtered fluid is exiting the filter medium pack at the second axial side 8.

The embodiments of filter elements shown on FIG. 18*a* and FIG. 18*b* use a different type of filter medium pack 10. Indeed, these filter medium packs 10 include an annular filter medium radially delimited by an outer side 6 and an inner side 6*a*. The outer side is permeable for receiving unfiltered fluid, such as air in case the filter element is an air filter element, and this outer side is corresponding to the circumferential side 6 of the filter medium pack 10. The inner side 6*a* is configured for outputting filtered fluid into a cavity 30 of the annular filter medium. A flange 17 is closing the first axial side 7 of the filter medium pack and the second axial side 8 of the filter medium pack is configured for evacuating filtered fluid from the cavity 30.

The disclosure also pertains to a filter system 200 comprising an alternative filter element as discussed above and as illustrated on FIGS. 18*a* to 18*d*. The filter system 200 further comprises a housing 50 comprising an outer sidewall 51 enclosing or partly enclosing the circumferential side 6 of the filter medium pack 10, and a tube-shaped wall portion 55 defining an inner radial surface 55*i* and an outer radial surface 55*o*, and wherein the second circumferential sealing surface of the second collar-shaped portion 20*b* is encircling and sealingly cooperating with the surface 55*o* and/or surface 55*i* of the tube-shaped wall portion 55 located inside the housing.

According to a further aspect of the disclosure, a housing 50 for a filter element 100 discussed above in relation to FIGS. 18*a* to 18*b* is provided. The housing 50 comprises a tube-shaped wall portion 55 located inside the housing and wherein an outer surface 55*o* of the tube-shaped wall portion is configured for forming an internal sealing surface for cooperating with the second collar-shaped portion 20*b* of the bridge seal arrangement 20. As mentioned above, this wall portion is not necessarily a cylindrical tube-shaped portion but it can have any shape including irregular shapes such as a drop shape.

What is claimed is:

1. A filter element for filtering a fluid comprising a filter medium pack extending along a longitudinal axis from a first end to a second end and having:
   an axial inlet side at said first end for receiving unfiltered fluid; and
   a circumferential side forming a radial boundary of the filter medium pack;
   wherein said filter medium pack is configured for insertion into a housing so as to enclose or partly enclose said circumferential side of the filter medium pack with an outer sidewall of the housing;
   a bridge seal arrangement for sealingly bridging a gap between the radial boundary of the filter medium pack and the outer sidewall of the housing, said bridge seal arrangement having:
      a first collar-shaped portion comprising a first circumferential sealing surface sealingly coupled to said circumferential side of the filter medium pack or sealingly coupled to a border of said axial inlet side; and
      a second collar-shaped portion coupled with said first collar-shaped portion, and wherein said second collar-shaped portion comprises a second circumferential sealing surface configured for encircling and sealingly cooperating with the outer sidewall of the housing;
   wherein the bridge seal arrangement is elastically deformable such that a circumference of the second circumferential sealing surface can be increased from a first value ($C_{out}$) to a second value ($C_{in}$) that is at least 10% greater than the first value ($C_{out}$), when moving from an un-sealed position to a sealed position.

2. The filter element of claim 1, wherein said filter medium pack includes a filter medium that is one of a fluted filter medium and a pleated filter medium.

3. The filter element of claim 1, wherein said bridge seal arrangement comprises an elastic and stretchable band and wherein said first collar-shaped portion and said second collar-shaped portion correspond to, respectively, a lower portion and an upper portion of said elastic and stretchable band.

4. The filter element of claim 1, wherein said bridge seal arrangement is configured for elastically deforming said second collar-shaped portion when positioned around the outer sidewall of the housing so as to develop an opposing radial force for pressing the second circumferential sealing surface against the outer sidewall of the housing.

5. The filter element of claim 1, wherein said bridge seal arrangement is configured for moving said second collar-shaped portion with respect to said first collar-shaped portion from the un-sealed position to the sealed position and vice-versa.

6. The filter element of claim 5, wherein said bridge seal arrangement is configured for stretching and/or flexing said second collar-shaped portion when moving from the un-sealed position to the sealed position, thereby elastically deforming the second collar-shaped portion when in the sealed position so as to develop a radial opposing force pressing the second circumferential sealing surface against the outer sidewall of the housing.

7. The filter element of claim 5, wherein said bridge seal arrangement is configured such that said second circumferential sealing surface forms a radially outward-facing circumferential surface and a radially inward-facing circumferential surface when said second collar-shaped portion is positioned in, respectively, said un-sealed position and said sealed position.

8. The filter element of claim 5, wherein said bridge seal arrangement comprises one or more predetermined folding lines configured for facilitating the movement of the second collar-shaped portion between the sealed position and the un-sealed position.

9. The filter element of claim 2, wherein said fluted filter medium comprises coiled layers of fluted filter material and wherein an outer surface of an outer layer of the coiled fluted filter medium forms said circumferential side of the filter medium pack.

10. The filter element of claim 1, wherein said second collar-shaped portion comprises a sealing rib and wherein a radial surface of said radial sealing rib forms said second circumferential sealing surface.

11. The filter element of claim 1, wherein the second collar-shaped portion comprises an inwardly protruding portion configured for fitting and/or sealingly cooperating with an indentation portion of the outer sidewall of the housing.

12. The filter element of claim 5, wherein the second collar-shaped portion comprises an engaging section configured for engaging with a matching section of the outer sidewall of the housing so as to hold the second collar-shaped portion in place when in the sealed position.

13. The filter element of claim 2, wherein said filter medium pack comprises a supporting shell surrounding the filter medium or surrounding part of the filter medium and wherein an outer surface of said supporting shell forms said circumferential side of the filter medium pack.

14. The filter element of claim 1, wherein said first collar-shaped portion is made out of a material of any of: an elastomer, a synthetic rubber, a natural rubber, a thermoplastic elastomer, a thermoset elastomer, a thermoplastic vulcanizate, ethylene propylene diene monomer rubber, a polymer, a polyurethane, a metal, a plastic, or a combination of any these materials.

15. The filter element of claim 1, wherein said second collar-shaped portion is made out of or partly made out of any of: an elastomer, a synthetic rubber, a natural rubber, a thermoplastic elastomer, a thermoset elastomer, a thermoplastic vulcanizate, ethylene propylene diene monomer rubber, a polymer, a polyurethane, or a combination of any of these materials.

16. The filter element of claim 1, wherein said first collar-shaped portion and said second collar-shaped portion form a coupled body made out of a single material.

17. The filter element of claim 1, wherein a glue or any other adhesive means couples said first circumferential sealing surface to said circumferential side or to said border of the axial inlet side.

18. The filter element of claim 1, wherein said bridge seal arrangement comprises a bridging portion coupling said second collar-shaped portion with said first collar-shaped portion, wherein said bridging portion is made out of or partly made out of any of an elastomer, a synthetic rubber, a natural rubber, a thermoplastic elastomer, a thermoset elastomer, a thermoplastic vulcanizate, ethylene propylene diene monomer rubber, a polymer, a polyurethane, or a combination of any of these materials.

19. The filter element of claim 1, wherein the second value $C_{in}$ is more than 10% greater than the first value $C_{out}$.

20. A filter element comprising:
a filter element for filtering a fluid comprising a filter medium pack extending along a longitudinal axis from a first end to a second end and having:
an axial inlet side at said first end for receiving unfiltered fluid; and
a circumferential side forming a radial boundary of the filter medium pack;
wherein said filter medium pack is configured for insertion into a housing so as to enclose or partly enclose said circumferential side of the filter medium pack with an outer sidewall of the housing;
a bridge seal arrangement for sealingly bridging a gap between the radial boundary of the filter medium pack and the outer sidewall of the housing, said bridge seal arrangement having:
a first collar-shaped portion comprising a first circumferential sealing surface sealingly coupled to said circumferential side of the filter medium pack or sealingly coupled to a border of said axial inlet side; and
a second collar-shaped portion coupled with said first collar-shaped portion, and wherein said second collar-shaped portion comprises a second circumferential sealing surface configured for encircling and sealingly cooperating with the outer sidewall of the housing;
wherein said bridge seal arrangement is configured for moving said second collar-shaped portion with respect to said first collar-shaped portion from an un-sealed position to a sealed position and vice-versa, and wherein said bridge seal arrangement comprises a rigid guiding element attached to said second collar-shaped portion for facilitating the moving of the second collar-shaped portion between the sealed position and un-sealed position.

21. The filter element of claim 1, further comprising a fixation clamp, positioned around the second collar-shaped portion, wherein said fixation clamp is configured for pressing said second circumferential sealing surface against the outer sidewall of the housing.

22. The filter element of claim 1, wherein a cross-section between said circumferential side of the filter medium pack and a plane perpendicular to said longitudinal axis has a shape of a circle, an oval, an ellipse, or a rounded square.

23. The filter element of claim 1, wherein said filter medium pack has an axial outlet side at said second end for outputting filtered fluid, or, alternatively, wherein said filter medium pack has a closed flange located at said second end of the filter medium pack and said circumferential side is configured for outputting filtered fluid.

24. A filter system comprising:
a filter element for filtering a fluid comprising a filter medium pack extending along a longitudinal axis from a first end to a second end and having:
an axial inlet side at said first end for receiving unfiltered fluid; and
a circumferential side forming a radial boundary of the filter medium pack;
wherein said filter medium pack is configured for insertion into a housing so as to enclose or partly enclose said circumferential side of the filter medium pack with an outer sidewall of the housing;
a bridge seal arrangement for sealingly bridging a gap between the radial boundary of the filter medium pack and the outer sidewall of the housing, said bridge seal arrangement having:
a first collar-shaped portion comprising a first circumferential sealing surface sealingly coupled to said circumferential side of the filter medium pack or sealingly coupled to a border of said axial inlet side; and
a second collar-shaped portion coupled with said first collar-shaped portion, and wherein said second collar-shaped portion comprises a second circumferential sealing surface configured for encircling and sealingly cooperating with the outer sidewall of the housing;
wherein said bridge seal arrangement comprises one or more handles coupled to said second collar-shaped portion; and
one or more protruding elements provided on said outer sidewall of the housing;
wherein said second circumferential sealing surface is encircling and sealingly cooperating with the outer sidewall of the housing, and wherein each of said one or more handles is coupled to a corresponding protruding element for keeping the bridge seal arrangement in place.

25. The filter system of claim 24, comprising one or more latches for latching a pre-cleaner or a filter cover to the housing, wherein each of said one or more latches is coupled with a corresponding handle of said one or more handles of said bridge seal arrangement.

26. The filter system of claim 24, further comprising a filter cover to protect at least part of the axial inlet side of the filter medium pack, wherein the filter cover comprises a circumferential cover portion that is positioned around the second collar-shaped portion and is configured for pressing the second circumferential sealing surface against the outer sidewall of the housing.

\* \* \* \* \*